(12) United States Patent
Nomura et al.

(10) Patent No.: US 6,368,701 B1
(45) Date of Patent: Apr. 9, 2002

(54) FIBER-REINFORCED RESIN MOLDED ARTICLE AND METHOD OF MANUFACTURING THE SAME

(75) Inventors: Manabu Nomura; Toru Shima; Atsushi Sato, all of Ichihara (JP)

(73) Assignee: Idemttsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 09/199,819

(22) Filed: Nov. 25, 1998

(30) Foreign Application Priority Data

Nov. 26, 1997 (JP) .............................. 9-324040
Dec. 17, 1997 (JP) .............................. 9-347606
Dec. 18, 1997 (JP) .............................. 9-348382
Dec. 22, 1997 (JP) .............................. 9-352688

(51) Int. Cl.$^7$ ................................ B32B 7/02
(52) U.S. Cl. .................. 428/218; 428/310.5; 428/319.3
(58) Field of Search ............................. 428/218, 310.5, 428/319.3

(56) References Cited

U.S. PATENT DOCUMENTS 5,087,511 A * 2/1992 Locey et al.
6,129,870 A * 10/2000 Hettinga

* cited by examiner

Primary Examiner—Rich Weisberger
(74) Attorney, Agent, or Firm—Oblon, Spivak, McClelland, Maier & Neustadt, P.C.

(57) ABSTRACT

A fiber-reinforced lightweight resin molded article with pores has a portion having a porosity lower than that of other general portions. Such a low-porosity portion serves as a rib in the resultant molded articles, to thereby enables to provide a fiber-reinforced lightweight resin molded article having excellent rigidity, bending strength, impact strength, uniformity of strength, resistance to local stress and torsion. The present invention also provides an efficient method for manufacturing the fiber-reinforced lightweight resin molded article.

3 Claims, 11 Drawing Sheets

FIBER-REINFORCED RESIN MOLDED ARTICLE AND METHOD OF MANUFACTURING THE SAME

BACKGROUND OF THE INVENTION

1. Field of the Invention

The present invention relates to a fiber-reinforced resin molded article and a method of manufacturing the same, and more specifically to a lightweight resin molded article reinforced with glass fiber or like fibers, which has excellent rigidity, bending strength, impact strength, uniformity of strength, resistance to local stress and torsion, such as a fiber-reinforced resin molded article having a rib structure or a rib-like structure in the interior of the molded article. The present invention also relates to an efficient method for manufacturing the same.

2. Description of the Related Art

Conventionally, there has been known a fiber-reinforced resin molded article reinforced by addition of fibers such as glass fiber. Since the fiber-reinforced resin molded article is excellent in mechanical characteristics such as tensile strength and bending strength, and in heat resistance, it is widely used for automobile parts such as in-pane cores, bumper beams, door steps, roof-racks, rear quarter panels, and air cleaner cases, and for construction/civil engineering materials' such as panels for external walls or partition walls, and cable troughs. In manufacture of these fiber-reinforced resin molded articles, there may be employed an injection molding method for injecting a fiber-containing molten resin into a cavity within molds. This injection molding method enables molding of an article having an intricate shape, as well as mass production of articles of the same shape since a predetermined molding cycle can be repeated continuously.

When the amount of the fiber added to the fiber-reinforced resin molded article manufactured through injection molding is increased in order to improve the strength and rigidity thereof, the article tends to gain weight and suffer severe warp. For the purpose of reducing the weight of the molded articles, as well as solving other problems, Japanese Patent Application Laid-Open (kokai) Nos. 7-247679, etc. disclose an expansion injection molding method in which a foaming agent is added to resin material and the material is foamed and molded into a molded article. However, in this expansion injection molding method, if a considerable amount of foaming agent is used for reducing the weight of the molded article, a sufficient expansion ratio is not easily obtained. Even if a sufficient expansion ratio is obtained, the appearance of the molded article is impaired due to foaming, large pores are easily formed within the molded article, and uniform pores are not easily formed therein. Therefore, mechanical requirements such as strength, rigidity, and impact resistance may not be sufficiently met, despite the molded article containing fiber for reinforcement.

To solve the above-mentioned problems, and to reduce the weight of molded articles while maintaining the quality of appearance and mechanical characteristics such as strength, rigidity, and impact resistance of the molded article, the following techniques have been proposed: (1) an expansion molding method in which fiber-reinforced resin pellets containing relatively long fiber are melted into molten resin and the molten resin is expanded during molding through utilization of the springback phenomenon caused by the contained fiber, to thereby obtain a lightweight molded article; (2) an expansion molding method in which a foaming agent for supplementing the expansion of resin is mixed into the fiber-reinforced resin pellets in item (1) above in order to further reduce the weight of molded articles (International Patent Publication WO97/29896). These methods sufficiently reduce the weight of molded articles without impairing the mechanical characteristics thereof, and are effective in reduction of the weight of fiber-reinforced resin molded articles.

As another method, there has been proposed (3) a method of manufacturing foamed resin molded articles in which a molten resin containing a chemical foaming agent is charged, through injection or injection compression, into the cavity of molds which comprise a movable core having a slit; the resin surface in contact with the mold is cooled and solidified without foaming; the capacity of the cavity is expanded by moving the movable core so as cause the molten resin to foam in the increased capacity of the cavity, to thereby manufacture a foamed resin molded article having a rib structure (Japanese Patent Application Laid-Open (kokai) No. 9-104043).

However, depending on the degree of weight reduction (expansion) or shape of a molded article; for example, in such a case in which the molded article has a large region or capacity the molded article obtained through the above method (1) or (2) may have insufficient bending strength and rigidity, yet insufficient resistance to local stress, low uniformity of strength and resistance to torsion, requiring improvements. In the above method (3) using a foaming agent, expansion of the foaming agent is difficult to suppress at the time of injection. Especially, during injection molding with compressed pressure, the resin tends to foam at the time of injection due to reduction in resin pressure, resulting in silver marks on the surface of the resultant molded article. Also, at a high expansion ratio, large pores are formed within the foamed portion as shown in the Examples herein, resulting in a molded article of poor uniformity. Moreover, even if reduction of the weight is achieved, molded articles having sufficient strength are not easily obtained. Furthermore, since the foamed product comes to have closed cells, the cooling time of the resultant molded article is extended. As a result, the molding cycle is prolonged, which is a problem in productivity.

SUMMARY OF THE INVENTION

An object of the present invention is to provide a fiber-reinforced resin molded article which has excellent bending strength, rigidity, impact strength, heat resistance, sufficient resistance to local stress and torsion, and uniformity.

Another object of the present invention is to provide a method of manufacturing such a resin molded article.

In view of the foregoing, the present inventors conducted careful studies on the overall structure—including the internal structure—of fiber-reinforced lightweight resin molded articles with dispersed pores therein and the properties thereof. As a result, they found that, in a conventional method in which a movable core is simply retracted for expansion, there is obtained a resin molded article having a non-expansion or low-expansion portion formed in the peripheral edge thereof, and near-uniform expansion occurs in other general portions such as the central portion thereof having a flat-shaped structure. They also found that if a molded article has a coarse-and-dense structure in terms of pores rather than the case in which pores are uniformly dispersed over the entirety of a molded article, and the molded article also has a unique rib-like structure by which a function of a rib is exerted between the two skin layers, the properties of the molded article are improved.

In connection with the method of forming the above-mentioned rib or rib-like structure within a resin molded article, the present inventors found firstly that if a grooved portion is provided in the thickness direction of a uniformly expanded portion, the grooved portion serves as a structure equivalent to a rib having a low porosity. They also found that the structure is attained through a method in which fiber-containing molten thermoplastic resin is injected into a cavity formed by a movable core which can advance and retract relative to the cavity of the mold and which has a protruding portion for forming a grooved portion of the molded article, and in which the movable core is subsequently retracted so as to expand the capacity of the cavity.

Secondly, they found that if a low- or non-expansion portion is formed through changing the degree of expansion relative to the uniformly expanded portion of the molded article having a substantially uniform thickness, the low- or non-expansion region advantageously comes to substantially serve as a rib structure. They also found that the molded article having this structure can be manufactured through a molding method in which only the regions corresponding to the movable portions are expanded by use of a movable core which can advance and retract relative to the cavity and which has a plurality of cavity molding surfaces (movable core having a plurality of movable portions).

Thirdly, the present inventors found that the properties of a molded article are improved if the structure of a uniformly expanded portion is changed so that the molded article attains a kind of rib structure in which substantially no or very few pores are formed in the thickness direction between the skin layers, and that such a molded article can be manufactured through provision of a slit on the cavity side of the movable core.

Fourthly, the present inventors found that if a rib-like or dispersing-type protruding portion is formed on a uniformly expanded portion, the protruding portion exhibits reinforcement effects similar to those of a rib, and, in addition, that if a fiber-containing molten resin (thermoplastic resin) is expanded, the region corresponding to the protruding portion, i.e., the portion of the protruding portion plus the region of the body thereunder, obtains a low-expanded, i.e., low-porosity dense structure as compared to other flat portions. They also found that the molded article having this structure can be manufactured through a method in which fiber-containing molten resin is injected into a specific mold cavity, and one mold is retracted toward the direction in which the mold cavity is expanded.

Based on the above findings, the present inventors have accomplished the present invention. Accordingly, the present invention provides the following:

(1) A fiber-reinforced lightweight resin molded article having pores, which comprises in the molded article a portion having a porosity lower than that of other general portions.

(2) The fiber-reinforced lightweight resin molded article according to item (1) above, wherein the portion having a porosity lower than that of other general portions is formed in the thickness direction of the molded article.

(3) The fiber-reinforced lightweight resin molded article according to item (1) above, wherein the portion having a porosity lower than that of other general portions has a rib structure or a rib-like structure.

(4) A fiber-reinforced lightweight resin molded article having pores, wherein a grooved portion is formed in the thickness direction of the molded article.

(5) A fiber-reinforced lightweight resin molded article according to item (4) above, wherein a resin portion forming a grooved portion has a porosity lower than that of other flat portions.

(6) A fiber-reinforced lightweight resin molded article according to item (4) or (5) above, wherein the molded article contains 10–70 wt. % glass fiber having a mean fiber length of 1–20 mm.

(7) A fiber-reinforced lightweight resin molded article according to any of items (4)–(6) above, wherein a face material is integrally molded with the molded article.

(8) A method of manufacturing a fiber-reinforced lightweight resin molded article having a grooved portion in the thickness direction of the molded article, which comprises the steps of injecting a fiber-containing molten thermoplastic resin into a mold cavity formed within a mold having a movable core which can advance and retract relative to the mold cavity and also having a protruding portion for forming a grooved portion in the molded article in the thickness direction of the molded article; and retracting the movable core toward the direction in which the capacity of the mold cavity is expanded.

(9) A method of manufacturing a fiber-reinforced lightweight resin molded article according to item (8) above, wherein a fiber-containing molten thermoplastic resin is injected into a mold cavity formed by a fixed mold, a moving mold having a protruding portion for forming a grooved portion of the molded article, and a movable core capable of advancing and retracting within the moving mold.

(10) A method of manufacturing a fiber-reinforced lightweight resin molded article according to item (9) above, wherein at the time of injection a part of a mold cavity is defined by a gap between the protruding portion of a moving mold and a movable core.

(11) A method of manufacturing a fiber-reinforced lightweight resin molded article according to any of items (8)–(10) above, wherein a gas is injected into the interior of the fiber-reinforced lightweight resin molded article within the mold cavity.

(12) A method of manufacturing a fiber-reinforced lightweight resin molded article according to any of items (8)–(11) above, wherein a fiber-containing molten thermoplastic resin is injected into the mold cavity on the surface of which a face material is applied in advance.

(13) A method of manufacturing a fiber-reinforced lightweight resin molded article according to any of items (8)–(12) above, wherein the fiber-containing molten thermoplastic resin is obtained by plasticizing and melting fiber-containing thermoplastic resin pellets having a length of 2–100 mm and contains parallel-arranged fiber having the same length in an amount of 20–80 wt. % with respect to the weight of the resultant resin-fiber mixture, or obtained by plasticizing and melting a mixture of the pellets and other pellets containing fiber so that the amount of fibers is 10–70 wt. % with respect to the weight of the entirety of the mixture.

(14) A fiber-reinforced lightweight resin molded article containing pores, wherein portions other than the peripheral portion of the molded article are composed of a plurality of regions having different expansion coefficients.

(15) A fiber-reinforced lightweight resin molded article according to item (14) above, wherein portions other than the peripheral portion of the molded article are composed of a low expansion coefficient region having an expansion coefficient of 1.0–1.5 and a high expansion coefficient region having an expansion coefficient of 1.6–8.

(16) A fiber-reinforced lightweight resin molded article according to item (14) or (15) above, wherein the fiber contained in the molded article is glass fiber having a mean fiber length of 1–20 mm and the content thereof is 10–70 wt. %.

(17) A fiber-reinforced lightweight resin molded article according to any of items (14)–(16) above, wherein a face material is integrally molded with the molded article.

(18) A method of manufacturing a fiber-reinforced lightweight resin molded article, wherein a fiber-containing molten thermoplastic resin is injected into a cavity corresponding to a clearance provided by a movable core which has a plurality of surfaces facing the cavity and which can advance and retract relative to the mold cavity, and then the movable core is retracted toward the direction in which the capacity of the mold cavity is expanded.

(19) A method of manufacturing a fiber-reinforced lightweight resin molded article according to item (18) above, wherein a gas is injected into the interior of the fiber-containing molten thermoplastic resin in the mold cavity.

(20) A method of manufacturing a fiber-reinforced lightweight resin molded article according to item (18) or (19) above, wherein a fiber-containing molten thermoplastic resin is injected into the mold cavity on the surface of which a face material is applied in advance.

(21) A method of manufacturing a fiber-reinforced lightweight resin molded article according to any of items (18)–(20) above, wherein the fiber-containing molten thermoplastic resin is obtained by plasticizing and melting fiber-containing thermoplastic resin pellets having a length of 2–100 mm and contains parallel-arranged fiber having the same length in an amount of 20–80 wt. % with respect to the weight of the resultant resin-fiber mixture, or obtained by plasticizing and melting a mixture of the pellets and other pellets containing fiber so that the amount of fibers is 10–70 wt. % with respect to the weight of the entirety of the mixture.

(22) A fiber-reinforced resin molded article comprising skin layers, a fiber-containing coarse region having substantially continuous pores, and a fiber-containing dense region having substantially no continuous pores, wherein the dense region constitutes a rib structure which bridges the skin layers.

(23) A fiber-reinforced resin molded article according to item (22) above, wherein the fiber-containing coarse region has a porosity of 50–90% and the fiber-containing dense region has a porosity of 0–30%.

(24) A fiber-reinforced resin molded article according to item (22) or (23) above, wherein the fiber contained in the molded article is glass fiber having a mean fiber length of 1–20 mm and the content thereof is 10–70 wt. %.

(25) A fiber-reinforced resin molded article according to any of items (22)–(23) above, wherein a face material is integrally molded with the molded article.

(26) A method of manufacturing a fiber-reinforced resin molded article comprising a rib structure, wherein a fiber-containing molten resin is injected or compression-injected into a cavity formed by molds including a movable core which has a slit in communication with the cavity, and then the movable core is retracted toward the direction in which the capacity of the mold cavity is expanded.

(27) A method of manufacturing a fiber-reinforced resin molded article according to item (26) above, wherein the cavity is formed by a fixed mold, a moving mold, and a movable core which can advance and retract within the moving mold relative to the mold cavity.

(28) A method of manufacturing a fiber-reinforced resin molded article according to item (26) or (27) above, wherein a gas is injected into the interior of the fiber-containing molten resin in the cavity after the start of retracting of the movable core.

(29) A method of manufacturing a fiber-reinforced resin molded article according to any of items (26)–(28) above, wherein a fiber-containing molten resin is injected or compression injected into the cavity, on the surface of which a face material is applied in advance.

(30) A method of manufacturing a fiber-reinforced resin molded article according to any of items (26)–(29) above, wherein the fiber-containing molten thermoplastic resin is obtained by plasticizing and melting fiber-containing thermoplastic resin pellets having a length of 2–100 mm and contains parallel-arranged fiber having the same length in an amount of 20–80 wt. % with respect to the weight of the resultant resin-fiber mixture, or obtained by plasticizing and melting a mixture of the pellets and other pellets containing fiber so that the amount of fibers is 10–70 wt. % with respect to the weight of the entirety of the mixture.

(31) A fiber-reinforced lightweight resin molded article comprising a protruding portion, wherein the molded article contains pores and has a protruding portion on at least one of the surfaces extending perpendicularly to the thickness direction of the molded article, and the porosity of the region corresponding to the protruding portion is lower than that of other flat portions.

(32) A fiber-reinforced lightweight resin molded article comprising a protruding portion according to item (31) above, wherein the porosity of the region corresponding to the protruding portion is 0.1–60% and that of other flat portions is 30–90%.

(33) A fiber-reinforced lightweight resin molded article according to item (31) or (32) above, wherein the fiber contained in the molded article is glass fiber having a mean fiber length of 1–20 mm and the content thereof is 10–70 wt. %.

(34) A fiber-reinforced lightweight resin molded article according to any of items (31)–(33) above, wherein a face material is integrally molded with the molded article.

(35) A method of manufacturing a fiber-reinforced lightweight resin molded article comprising a protruding portion, wherein a fiber-containing molten resin is injected into a cavity formed by a pair of molds, one of which has a grooved portion for forming a protruding portion, and then one of the molds is retracted toward the direction in which the capacity of the mold cavity is expanded, whereby the porosity of the region corresponding to the protruding portion is lower than that of other flat portions.

(36) A method of manufacturing a fiber-reinforced lightweight resin molded article comprising a protruding portion according to item (35) above, wherein a gas is injected into the interior of the fiber-containing molten resin in the cavity.

(37) A method of manufacturing a fiber-reinforced lightweight resin molded article according to item (35) or (36) above, wherein a fiber-containing molten resin is injected into the cavity on the surface of which a face material is applied in advance.

(38) A method of manufacturing a fiber-reinforced lightweight resin molded article comprising a protruding portion according to any of items (35)–(37) above, wherein the fiber-containing molten thermoplastic resin is obtained by plasticizing and melting fiber-containing thermoplastic resin pellets having a length of 2–100 mm and contains parallel-arranged fiber having the same length in an amount of 20–80 wt. % with respect to the weight of the resultant resin-fiber mixture, or obtained by plasticizing and melting a mixture of the pellets and other pellets containing fiber so that the amount of fibers is 10–70 wt. % with respect to the weight of the entirety of the mixture.

According to the present invention, there is provided a fiber-reinforced resin molded article which has excellent bending strength, rigidity, impact resistance, heat resistance, sufficient resistance to local stress and torsion, and uniformity. Also, in the method of manufacturing the same according to the present invention, reduction in the weight of a molded article can be arbitrarily regulated by use of molds having relatively simple structure, and the excellent surface quality of a molded article can be obtained, for example, the flat structure of the exterior of a highly lightweight molded article can be maintained.

BRIEF DESCRIPTION OF THE DRAWINGS

FIG. 1 schematically shows a first embodiment of the method of manufacturing a fiber-reinforced lightweight resin molded article of a first mode in the present invention, wherein FIG. 1(A) shows a condition immediately before expansion of the cavity of the injection mold, and FIG. 1(B) shows a condition after the expansion.

FIG. 2 schematically shows the second embodiment of the method of manufacturing the fiber-reinforced lightweight resin molded article of the first mode in the present invention, wherein FIG. 2(A) shows a condition before expansion of the cavity of the injection mold, and FIG. 2(B) shows a condition after the expansion.

FIG. 3 schematically shows the third embodiment of the method of manufacturing the skin-integrated, fiber-reinforced lightweight resin molded article of the first mode in the present invention, wherein FIG. 3(A) shows a condition before expansion of the cavity of the injection mold, and FIG. 3(B) shows a condition after the expansion.

FIG. 4 schematically shows the first embodiment of the method of manufacturing the fiber-reinforced resin molded article of the second mode in the present invention, wherein FIG. 4(A) shows a condition before expansion of the cavity of the injection mold, and FIG. 4(B) shows a condition after the expansion.

FIG. 5 schematically shows the second embodiment of the method of manufacturing the skin-integrated, fiber-reinforced resin molded article of the second mode in the present invention, wherein FIG. 5(A) shows a condition before expansion of the cavity of the injection mold, and FIG. 5(B) shows a condition after the expansion.

FIG. 6 schematically shows the first embodiment of the method of manufacturing a fiber-reinforced resin molded article of the third mode in the present invention, wherein FIG. 6(A) shows a condition before expansion of the cavity of the injection mold, and FIG. 6(B) shows a condition after the expansion.

FIG. 7 schematically shows the second embodiment of the method of manufacturing the skin-integrated, fiber-reinforced resin molded article of the third mode in the present invention, wherein FIG. 7(A) shows a condition before expansion of the cavity of the injection mold, and FIG. 7(B) shows a condition after the expansion.

FIG. 8 schematically shows the first embodiment of the method of manufacturing the fiber-reinforced resin molded article of the fourth mode in the present invention, wherein FIG. 8(A) shows a condition before expansion of the cavity of the injection mold, and FIG. 8(B) shows a condition after the expansion.

FIG. 9 schematically shows the second embodiment of the method of manufacturing a fiber-reinforced resin molded article of the fourth mode in the present invention, wherein FIG. 9(A) shows a condition before expansion of the cavity of the injection mold, and FIG. 9(B) shows a condition after the expansion.

FIG. 10 schematically shows the third embodiment of the method of manufacturing the skin-integrated, fiber-reinforced resin molded article of the fourth mode in the present invention, wherein FIG. 10(A) shows a condition before expansion of the cavity of the injection mold, and FIG. 10(B) shows a condition after the expansion.

FIG. 11 schematically shows the fourth embodiment of the method of manufacturing the skin-integrated, fiber-reinforced article of the fourth mode in the present invention, wherein FIG. 11(A) shows a condition immediately before expansion of the cavity of a mold for integrally molding a resin and a face material, FIG. 11(B) shows a condition after the expansion, and FIG. 11(C) is a sectional view of a molded article manufactured according to the fourth embodiment of the fourth mode in the present invention, which shows the distribution of pores formed therein.

DESCRIPTION OF THE PREFERRED EMBODIMENTS

Figure 1:
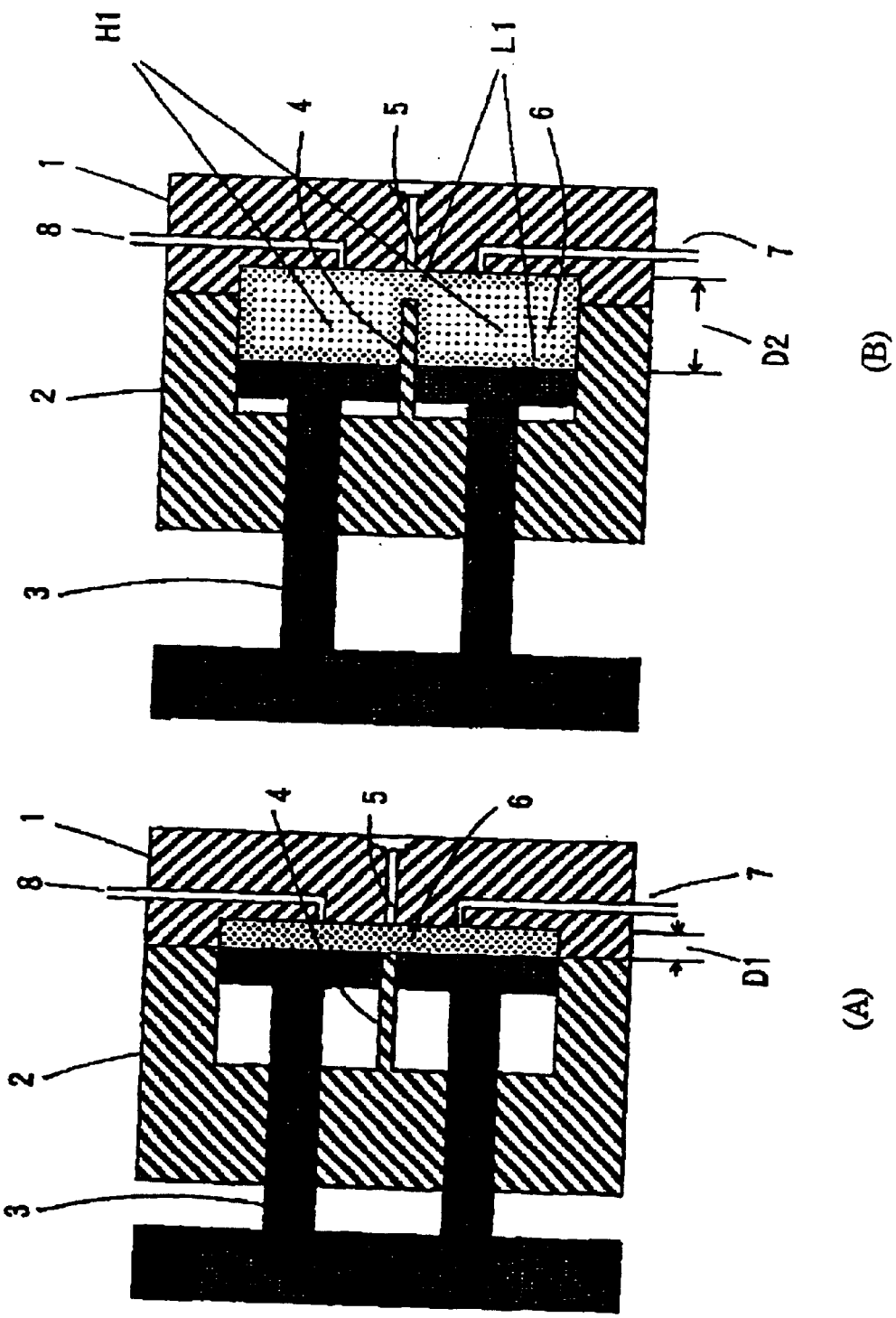

The present invention will next be described in detail.

The present invention provides a fiber-reinforced lightweight resin molded article which has a portion having a porosity lower than that of other flat (or general) portions; more specifically, a rib or rib-like structure in the interior of the molded article which contains pores therein, more specifically, a rib or rib-like structure in the thickness direction of the molded article. The present invention includes four specific modes for the molded article and methods suitable for manufacturing the respective modes as follows:

First Mode

A first mode of the present invention is directed to a fiber-reinforced lightweight resin molded article having therein pores, specifically dispersed pores, and a grooved portion in the thickness direction of the molded article, and more specifically to a fiber-reinforced lightweight resin molded article wherein a resin portion forming the grooved portion has a porosity lower than that of other flat portions. The first mode of the present invention is also directed to a method of manufacturing such a fiber-reinforced lightweight resin molded article in an efficient manner.

In manufacture of the fiber-reinforced lightweight resin molded article having dispersing pores therein, a fiber-containing molten resin (thermoplastic resin) is injected or compression-injected into a mold cavity in order to fill the cavity with the resin, and then the mold cavity is expanded to the volume of a desired molded article. At this time, the molten resin is expanded to the desired volume by virtue of the springback phenomenon caused by tangled fibers contained therein. After cooling, the mold is opened, and there is obtained a fiber-reinforced lightweight resin molded article having dispersed pores therein.

The manufacturing method of the first mode is characterized in that a fiber-containing molten resin is injected into a mold cavity formed by a mold having a protruding portion for forming a grooved portion in the molded article, and then a movable core is retracted, while the protruding portion remains at its position, so as to expand the cavity, thereby completing the molding.

In the general case where a single movable core having a simple shape, i.e., a surface shape identical with that of the entire cavity surface (in a flat shape) is used, there is obtained a fiber-reinforced lightweight resin molded article having a near-uniform expansion coefficient. Although the molded article is light, it has a larger area and volume. When the weight of the molded article is reduced further, the article may not attain sufficient strength and rigidity. In contrast, in the case in which there is used a movable core such that a gap exists between core and the side wall of a mold cavity, there is obtained a high-expansion-coefficient molded article which has a peripheral portion of non- or low expansion, and other non-peripheral portions, i.e., the central portion, are of uniform expansion. Since this molded article attains an unexpanded skin layer on its surface in contact with the wall of the molds under cooling, the molded article is lightweight and has high strength and rigidity. However, such a molded article having a three-layered structure composed of a skin layer/an expansion layer/a skin layer may fail to attain sufficient rigidity when its area and volume are large, and may have insufficient resistance to local stress and torsion.

In order to solve these problems, in the first mode, the skin layers on the two surfaces are partially connected via a non- or low-expansion resin. Therefore, in the manufacturing method according to the first mode, a fiber-containing molten thermoplastic resin is injected into a mold cavity formed by a movable core having a protruding portion for forming a grooved portion of a molded article, and then the movable core is retracted toward the direction in which the mold cavity is expanded.

The shape and number of core(s) are properly determined according to the size and desired features of the molded article. The location, shape, size, number, distribution, etc. of the protruding portion(s) for forming the grooved portion are arbitrarily determined as appropriate in consideration of the shape, thickness, area, volume, degree of weight reduction, environment of use, and desired performance of the molded article. Generally, the grooved portion is provided in the reverse surface of the molded article and has a width of about 2–10 mm and a length of 10 mm or more. Preferably, the grooved portion is continuously or intermittently formed in any direction. The resin layer between the bottom surface of the grooved portion and the molded article surface at the opposite side is preferably a resin layer having substantially no or very few pores. Generally, the mold having the protruding portion for forming the grooved portion is a moving mold, and a movable core which can advance and retract therewithin and a fixed mold form a mold cavity. With this protruding portion provided in the movable core, injection of a molten resin and retraction of the movable core can be performed while the protruding portion is thrust into the cavity, and the cavity can be expanded to a predetermined volume while the protruding portion is fixed in position. Therefore, within a certain range of weight reduction, another protruding portion can be provided in the fixed mold facing the movable core.

In the case in which a protruding portion is provided in the moving mold, the disposition of molds is designed such that a movable core can advance and retract within the moving mold having the protruding portion. Also, a gap may be provided in the protruding portion facing the movable core so that the gap forms a part of the mold cavity at the time of injection of a molten resin. With this structure, the shape of the surface of the protruding portion facing the cavity is transferred to a finished molded article so that the influence exerted by the subsequent retraction of the movable core is eliminated, and the skin layers are formed to be firm. Likewise, the position of the protruding portion when thrust into the mold cavity and that of the movable core when thrust into the same are determined as appropriate. Generally, they are determined so as to provide an appropriate clearance between the protruding portion and the surface of the mold facing thereto.

Second Mode

Next will be described a second mode of the present invention.

The second mode is directed to a fiber-reinforced lightweight resin molded article having pores, specifically dispersed pores, wherein the portions other than the peripheral portion of the molded article are composed of a plurality of regions having different expansion coefficients. The second mode of the present invention is also directed to a method of manufacturing such a fiber-reinforced lightweight resin molded article in an efficient manner.

The molded article is manufactured through a molding method in which a resin is expanded to the expanded portion of the mold cavity provided by the retraction of a movable core which can advance and retract relative to the cavity and which has a plurality of surfaces facing the cavity.

To solve the above-mentioned problem relating to the use of a single movable core having a simple shape, in the manufacture method of the second mode, the skin layers on the two surfaces of the molded article are partially connected via a non- or low-expansion layer. Therefore, in the manufacture method according to the second mode, a fiber-containing molten thermoplastic resin is injected into a mold cavity, which is a clearance formed by the cavity-forming surface of a movable core thrust into the cavity, which has a plurality of surfaces (a plurality of movable portions) facing the cavity and can advance and retract relative to the mold cavity, and then the movable core is retracted toward the direction in which the mold cavity is expanded.

The shape and number of a plurality of the movable cores for forming a cavity-forming surface are properly determined according to the size and desired features of the molded article. Likewise, the positions of a plurality of the movable cores when thrust into the cavity are determined as appropriate. Generally, the position is determined so as to provide a proper clearance between the movable cores and another mold facing thereto in consideration of the expansion coefficient of the molded article.

Third Mode

Next will be described a third mode of the present invention.

The third mode is directed to a fiber-reinforced resin molded article comprising skin layers, a coarse fiber-containing region having substantially continuous pores, and a dense fiber-containing region having substantially no continuous pores, wherein the dense region constitutes a rib structure which bridges the skin layers. The third mode of the present invention is also directed to a method suitable for manufacturing such a fiber-reinforced resin molded article.

In the third mode, a fiber-reinforced lightweight resin molded article having dispersed pores is manufactured through utilization of the springback phenomenon caused by tangled fibers contained in the molten resin by use of a set of molds including a movable core which has a slit in communication with a mold cavity. That is, the fiber-containing molten resin is injected or compression-injected into the mold cavity so as to charge the resin in the cavity. When the charged resin enters the slit where cooling is intense, the flowability of the resin is lowered or lost. Subsequently, the movable core is retracted to the position which provides the volume of the finished molded article, and the resin is then expanded due to the above-mentioned springback phenomenon, followed by cooling, to thereby obtain a fiber-reinforced lightweight resin molded article having pores therein.

Meanwhile, the resin within the slit has been subjected to cooling and transfer of the mold shape. When the movable core is retracted, the resin is released from the movable core and remains in the interior of the cavity. Therefore, the resin within the slit is substantially unexpanded. Even if the resin is expanded, the degree of expansion is very low, and thus under normal conditions there occurs no expansion providing continuous pores, resulting in the formation of a dense region. The resin within the slit constitutes a rib structure which connects the skin layers on the two sides of the molded article. This structure improves the strength, rigidity, uniformity of strength, and resistance to torsion in a molded article having larger area and volume, while achieving reduction of the weight of the molded article.

To solve the above-mentioned problems relating to the use of a single movable core having a simple shape, in the manufacturing method of the third mode, the skin layers on the two surfaces of the molded article are partially connected via a dense resin region having a substantially low porosity.

Therefore, in the manufacturing method according to the third mode, a fiber-containing molten resin is injected or compression-injected into a mold cavity so as to charge the resin in the cavity formed by a set of molds including a movable core which has a slit in communication with the cavity and which can advance and retract relative to the mold cavity, and then the movable core is retracted for expansion of the resin to the position which provides the volume of the finished molded article, with the resin within the slit being maintained in the cavity after being cooled.

The volume of the cavity when the resin is injected or compression-injected therein so as to charge the resin in the cavity is determined such that it is smaller than the volume of the finished molded article, in consideration of the thickness and weight reduction (expansion coefficient) of the finished molded article. The initial mold cavity can be formed by a movable core having a slit in communication with a fixed mold and cavity. Preferably, however, it also comprises a moving mold in addition to the movable core and has a mold structure such that the movable core can advance and retract within the moving mold.

The shape of the movable core is properly determined according to the size and desired features of the molded article. The location, shape, size, number, distribution, etc. of the slit(s) provided in the movable core are arbitrarily determined as appropriate in consideration of the shape, thickness, area, volume, degree of weight reduction, environment of use, and desired performance of the molded article. Typically, at least one slit is provided in the central portion of the molded article, having a shape of a groove having a width of about 1–10 mm and a length of 10 mm or more. Preferably, the slit is continuously or intermittently formed in any direction. The depth of the slit in the thickness direction is about the same as that of the molded article or slightly larger in some cases. The mold is preferably cooled in such a manner that the slit of the movable core is cooled intensely. A protruding portion formed on a fixed mold corresponding to the slit of the movable core can promote cooling at the entrance of the slit and enhance the rib structure effects, depending on the thickness of the initial cavity.

The molds are preferably formed of a fixed, movable, and moving molds since the degree of freedom of molding conditions is secured and the molded article is easily released. Therefore, the mold cavity is formed of a moving mold, a movable core which can advance and retract within the moving mold, and a fixed mold. In this case, the portions of the cavity other than the slit may be approximately flat. A gap may be provided between the moving mold and the movable core so that the gap forms a part of the mold cavity at the time of injection of a molten resin. With this structure, the shape of the surface of the peripheral edge of the cavity is transferred to the peripheral edge of a finished molded article when molten resin is injected or compression-injected into the mold cavity. Thus, the subsequent retraction of the movable core hardly causes expansion, with the shape being maintained, resulting in the firm formation of a dense region in the peripheral edge as well.

Fourth Mode

Next will be described a fourth mode of the present invention.

The fourth mode is directed to a fiber-reinforced lightweight resin molded article containing therein pores, specifically dispersed pores, and having a protruding portion on at least one surface in the thickness direction of the molded article, and wherein a region corresponding to the protruding portion has a porosity lower than that of other portions. The fourth mode of the present invention is also directed to a method suitable for manufacturing such a fiber-reinforced resin molded article.

The fourth mode is characterized in that, when pores are formed by expansion of a molten resin to the volume of a mold cavity by virtue of the springback phenomenon caused by tangled fibers contained therein, a fiber-containing molten resin is injected into a mold cavity having a grooved portion to form a protruding portion on at least a surface in the thickness direction of the molded article having a flat-shape structure, and a mold is retracted to a direction that expands the mold cavity. Thus, the region corresponding to the protruding portion of the molded article has a porosity lower than that of other portions.

When a cavity having a flat shape is used, there is obtained a fiber-reinforced lightweight resin molded article having a near-uniform expansion coefficient (porosity). In contrast, in the case in which there is used a movable core such that a gap exists between the movable core and the sidewall of a mold cavity, there is obtained a molded article which has a peripheral portion of non- or low expansion, and other non-peripheral portions, i.e., the central portion, are of uniform high expansion. Since this molded article attains an unexpanded skin layer on the surface thereof in contact with the wall of the molds under cooling, the molded article is lightweight and has high strength and rigidity. However, this molded article having a three-layered structure composed of a skin layer/an expansion layer/a skin layer in the thickness direction may fail to attain sufficient rigidity when its area and volume are large, and may have insufficient resistance to local stress and torsion.

To solve these problems, in the fourth mode, the skin layers on the two surfaces are partially connected via a non- or low-expansion resin. Therefore, in the manufacturing method according to the fourth mode, a fiber-containing molten resin is injected into a mold cavity, which is a clearance formed by a movable core that can advance and retract relative to the mold cavity, and which has a grooved portion for forming a protruding portion in the thickness direction of the molded article, and in which the movable core is subsequently retracted so as to expand the cavity.

The location, shape, size, number, distribution, etc. of the grooved portion(s) for forming the protruding portion(s) are arbitrarily determined as appropriate in consideration of the shape, thickness, area, volume, degree of weight reduction, environment of use, and desired performance of the molded article. The grooved portion is provided on at least either a fixed or movable core forming the mold cavity, and may be provided on both fixed and movable cores at corresponding locations on both surfaces or at other locations. The protruding portion can be provided continuously in the peripheral edge of the molded article as well, thus improving the appearance of the peripheral portion of the molded article. Generally, however, since a molded article desirably has a smooth top surface, the protruding portion is preferably provided in the reverse surface of the molded article. The shape of the protruding portion is preferably rib-shaped so as to maximize its effect. Therefore, the protruding portion is typically provided in the reverse surface of the molded article, and has a width of about 2–20 mm and a length of 10 mm or more. Preferably, the protruding portion is continuously or intermittently formed in any direction. In the manufacturing method according to the fourth mode, surprisingly, a fiber-containing molten resin expands at different rates in the region corresponding to the grooved portion formed on the mold cavity and in other portions; that is, expansion in the grooved portion, i.e. a thick portion of the molded article, is suppressed, thus imparting a function as a rib to the protruding portion of the molded article as well as enhancing its rib effect due to a low porosity in the thickness direction even in the central portion of the molded article and a denser structure thereof compared with other portions.

In the method of manufacturing a fiber-reinforced lightweight resin molded article according to any of the modes described above, gas such as nitrogen can be injected into a fiber-containing molten resin in the cavity at any time between the initiation and termination of expansion of the mold cavity or after the termination thereof. The injection of gas promotes expansion of the fiber-containing molten resin, to thereby press the molten resin firmly against the molding surface of the molded article. Thus, since resin is cooled in close contact with the surface of the mold, no sink marks are formed on the surface of the molded article. In the third mode of the present invention, adhesion between a dense region of the slit and resin contained in a coarse region, which is an expanded portion, is expected to improve. Also, circulation of gas in the mold promotes cooling of the molded article, resulting in shortening of the molding cycle. In this case, addition of volatile liquid such as water can further enhance the cooling effect.

Also, the prior application of a face material may provide a fiber-reinforced lightweight resin molded article which is integrally molded with the face material. In the case in which a face material is integrally molded with a molded article, the face material is generally applied onto the fixed mold surface. In the case of a molded article whose surface is covered with a face material, a resin is injected through a side gate. For example, a grooved portion is generally formed in the resin surface behind the face material.

In the methods of the respective modes of the present invention, the fiber-containing molten resin is preferably a fiber-containing molten resin in the form of pellets having a length of 2–100 mm containing parallel-arranged fiber having the same length in an amount of 20–80 wt. %, or a mixture of such pellets and other pellets containing fiber in an amount of 10–70 wt. %, which is plasticized and melted.

In this context, the other pellets may typically be pellets of a thermoplastic resin, those containing any of various additives, those containing no fiber, or those obtained through melt-kneading of glass fiber and the like.

The other pellets described above maintain the fiber contained in a molten thermoplastic resin for a long time, and improve the dispersibility thereof during injection molding.

The materials selected as above provide a strong springback phenomenon. In other words, the glass fiber contained in a molten thermoplastic resin is maintained for a long time, and the dispersibility thereof is improved during molding. A small amount of a foaming agent (3 wt. % or less) may be added to the material resin, in order to compensate the deficiency of expansion.

In reduction of the weight of the fiber-reinforced lightweight resin molded article of the respective modes of the present invention, the overall expansion coefficient is selected within the range of 1.5–8, varying with the type of the fiber contained in the resin, content thereof, and required features of the desired molded article. If the expansion coefficient is less than 1.5, the effects rendered by the weight reduction are low, whereas if the expansion coefficient is in excess of 8, the surface smoothness of the molded article is lowered, the dense skin layers on the surfaces becomes thinner, and the strength is lowered.

The mean porosity is about 30–90%, preferably about 33–88%. If the mean porosity is 30% or less, the effects rendered by the weight reduction are low, whereas if the mean porosity is in excess of 90%, the surface smoothness of the molded article is lowered, the dense skin layers on the surfaces become thinner, and the strength is lowered.

The resin region of the molded article forming a rib has a porosity lower than that of other flat portions. Among the pores, those not in communication with other pores account for 0–30%.

In the first mode of the present invention, the porosity of the resin forming the protruding portion of the molded article is preferably lower than that of other flat portions.

In the fourth mode, the region corresponding to the protruding portion of the fiber-reinforced lightweight resin molded article has a porosity of 0.1–60%, and other flat portions have a porosity of 30–90%. These porositys are easily attained through regulation of the cavity volume at the time of injection of molten resin, and the degree of expansion of the resin obtained through expansion of the cavity volume to the volume of the finished molded article.

The mean length of the glass fiber contained in the molded article is 1–20 mm, preferably 2–15 mm. If the mean length is less than 1 mm, the entanglement of the fibers and degree of the expansion become insufficient, which is disadvantageous in terms of strength, rigidity, and impact resistance. If the mean length is in excess of 20 mm, the dispersibility and flowability of the fiber become insufficient at the time of melting, and thus the resin does not easily flow into a thin-wall portion such as s slit or a tip-end portion of the molds, which may result in defects in appearance or deteriorated moldability.

In the case in which glass fiber is used, the content is generally 10–70 wt. %, preferably 15–60 wt. %. If the content is less than 10 wt. %, the expansion, strength, rigidity, and heat resistance are not sufficient, whereas if the content is in excess of 70 wt. %, the flowability is decreased at the time of melting, which may-result in defects in appearance, or deteriorated expansion or moldability.

In this context, the expansion coefficient refers to "volume after expansion/volume without pores before expansion," and the porosity (%) to "(volume of molded article—volume without pores (volume before expansion)/volume of molded article)×100."

In the other flat coarse portions, the porosity of pores communicating with other pores is 50–90%. The term "volume of the molded article" may encompass a partial portion of the mold.

The thermoplastic resins usable in the respective modes of the present invention are not particularly limited, and there may be used polyolefin resins such as polypropylene, propylene-ethylene block copolymer, propylene-ethylene random copolymer, and polyethylene; polystyrene resins; ABS resins; polyvinyl chloride resins; polyamide resins; polyester resins; polyacetal resins; polycarbonate resins; polyaromatic ether resins; polyaromatic thioether resins; polyaromatic ester resins; polysulfone resins; and acrylate resins.

Of these thermoplastic resins, there may be preferably used polypropylene resins such as polypropylene, block copolymer or random copolymer of polypropylene and another olefin, and mixtures thereof; polyamide resins; polyester resins; and polycarbonate resins; more preferably polypropylene resins containing an acid-modified polyolefin resin modified with unsaturated carboxylic acid or a derivative thereof.

The usable fiber include ceramic fibers such as boron fiber, silicon carbonate fiber, alumina fiber, silicon nitride fiber, zirconia fiber; inorganic fibers such as glass fiber, carbon fiber, metallic fiber, copper fiber, brass fiber, steel fiber, stainless steel fiber, aluminum fiber, and aluminum alloy fiber; organic fibers such as polyester fiber, polyamide fiber, aramid fiber, and polyarylate fiber; among which glass fiber is preferably used.

As the material of the fiber-containing thermoplastic resin, there are preferably used fiber-containing thermoplastic resin pellets having a length of 2–100 mm and containing parallel-arranged fiber having the same length in an amount of 20–80 wt. %, or a mixture of such pellets and other pellets containing fiber in an amount of 10–70 wt. %. When pellets containing parallel-arranged fiber in an amount of 20–80 wt. % are plasticized, melted, or kneaded, the fibers contained therein are not easily ruptured, and excellent dispersibility is maintained. With the above-mentioned pellets, the springback phenomenon caused by the fiber-containing molten resin in the cavity is intensified, the length of fibers retained in the finished molded article is lengthened, and the properties and appearance of the surface of the molded article are improved. As the plasticizing screw for injection molding, there is preferably used a plasticizing screw providing a relatively low expression coefficient, in view of suppression of rupture of fibers.

As the glass fiber, there are used glass fibers of E-glass, S-glass, or like glass having a mean fiber diameter of 25 $\mu$m or less, preferably 3–20 $\mu$m. If the fiber diameter is less than 3 $\mu$m, the glass fiber is not compatible with the resin during production of pellets, and thus the resin is not easily impregnated with the fiber. In contrast, if the fiber diameter is in excess of 20 $\mu$m, the appearance is deteriorated, fibers do not easily flow into a minute portion such as a rib, and they become susceptible to rupture and damage. In manufacture of pellets through a pultrusion molding method by use of the above-mentioned thermoplastic resin and glass fiber, the glass fiber is subjected to surface treatment with a coupling agent, and are formed into bundles of 100–10000 fibers, preferably 150–5000 fibers, via a binder.

The coupling agent may be selected as adequate from among conventional silane and titanium coupling agents. For example, there may be used aminosilane and epoxysilane such as $\gamma$-aminopropyltriethoxysilane, N-$\beta$-(aminoethyl)-$\gamma$-aminopropyltriethoxysilane, $\gamma$-glycidoxypropyltrimethoxysilane, and $\beta$-(3,4, epoxycyclohexyl)ethyltrimethoxysilane. Most preferably, the above-mentioned aminosilane compounds are used.

As the binder, there may be used a urethane binder, an olefin binder, an acrylic binder, a butadiene binder, or an epoxy binder. Of these binders, a urethane binder and an olefin binder are preferably used. As the urethane binder, there may be used either a one-component binder of oil-modified type, moisture-setting type, block-type, or a like type; or a two-component binder of catalyst-setting type, polyol-setting type, or a like type, so long as the urethane binder contains polyisocyanate which is obtained through polyaddition of diisocyanate and polyhydric alcohol. As the olefin binder, there may be used an acid-modified polyolefin resin modified with unsaturated carboxylic acid or a derivative thereof.

The fiber-containing resin pellets are manufactured through application/impregnation of the thermoplastic resin to the glass fiber bonded together with the above-mentioned binder. The methods of application/penetration of the glass fibers to the thermoplastic resin include a method in which bundles of fibers are passed through molten resin so as to impregnate the fibers with the resin, a method in which fibers are impregnated with molten resin adhering to the fibers while the molten resin is expanded with a die, or a like method. Further, in order to facilitate impregnation of the resin with fibers, i.e., in order to improve the wetting of the fibers, there may be employed a pultrusion molding method in which bundles of fibers under tension are passed through and pulled out from the interior of a die whose inner circumferential edge has projections and depressions; and the bundles of fibers are then passed through pressurized rollers in an additional step. If the glass fibers are easily soaked with the resin to be wet, the above-mentioned step of binding the fibers into bundles may be omitted, since the glass fibers are impregnated with the molten resin with ease, resulting in simplified manufacture of pellets. In this case, in order to facilitate the soaking, there may be effectively employed a method in which polarity is imparted to the resin, and a method in which functional groups reactive with a coupling agent are grafted on to the surfaces of the glass fibers.

Long fiber bundles (strands, etc.) impregnated with resin through these methods are cut along the width direction, to thereby obtain resin pellets which contain long fibers having the same length as the pellets. In this case, the resin pellets are not limited to those obtained through a method in which resin-containing long fiber bundles having a substantially circular lateral section are cut, and there may be used those obtained through a method in which resin-containing long fiber bundles in the form of a sheet, tape, or band containing flatly-arranged fibers are cut to a predetermined length.

The above-mentioned material resin may contain a foaming agent in an amount of 3 wt. % or less.

The foaming power of the foaming agent contained in the material compensates for the deficiency of restoration force (expansion) of fibers, when the restoration force (expansion) is insufficient in the springback phenomenon. As a result, the fiber-containing molten thermoplastic resin is reliably expanded to the volume of the molded article corresponding to the retraction of the movable core.

When the foaming agent is contained in an amount in excess of 3 wt. %, there may result generation of silver marks, defects in appearance, and large hollows within the molded article, resulting in considerably lowered strength and rigidity.

For these reasons, the content of the foaming agent is preferably reduced to as low as possible. Specifically, the content is 0.01–3 wt. %.

In this case, the type of the foaming agent is not particularly limited, so long as it is decomposed to generate a gas, and there may be used oxalic acid derivative, azo compound, hydrazin derivative, semicarbazide compound, azide compound, nitroso compound, triazole, urea, related compounds of these listed, nitrite salt, hydride, carbonate salt, and bicarbonate salt. More specifically, there may be used azodicarbonamide (ADCA), benzenesulfohydrazide, N,N-dinitropentamethylenetetramine, and terephthal azide. Also, as needed, there may be added thereto a filler such as a stabilizer, antistatic agent, weather resistant agent, short fibers, or talc.

As the gas injected into the fiber-containing molten thermoplastic resin in the cavity, there is preferably used a cooling gas at 15° C. or less, preferably 0° C. or less.

Also, the gas may be fed into the fiber-containing molten resin through a gas nozzle disposed in the nozzle of an injection apparatus for plasticizing and injecting the fiber-containing molten resin, or through a gas pin disposed in the sprue, runner, or cavity provided within the molds.

Of these gas nozzles and pins, preferably a gas pin provided within the molds, more preferably that disposed in the cavity, is used for injection of the gas.

The pressure of the gas is 0.01–20 MPa, more preferably 0.1–5 MPa, most preferably 0.5–2 MPa. The pressure of the gas is determined according to the size, shape, and expansion coefficient of the molded article; the flowability, viscosity, and fiber content of the molten resin; the shapes of the molds; and like factors. Generally, when the pressure of the gas is lowered, generation of large hollows within the molten resin is suppressed, and the strength is reliably secured. As a result, the gas does not easily enter the space between the molten resin surface and the mold surface, and defects such as generation of silver marks are thus suppressed.

As mentioned above, the gas can be injected under a relatively low pressure. This is because a great number of pores communicating with one another are retained within the molded article through utilization of the springback phenomenon caused by the fibers.

In contrast, since only isolated cells are formed in the process of reduction in the weight of conventional short-fiber-containing resin through addition of a foaming agent, expansion of the isolated cells is necessary for injection of a predetermined amount of the gas, i.e., a high-pressure gas is required rather than a low-pressure gas, resulting in large hollows.

That is, whether the method of weight reduction is achieved by means of large hollows or by means of continuous uniformly-dispersing pores is of great consequence.

If the pressure of the gas exceeds 20 MPa, the gas often enters the space between the molten resin surface and the mold surface, and large hollows are often formed, resulting in considerable increase in the incidence of defects in appearance such as silver marks and defects in function such as lowered strength. In contrast, the gas injection in the present invention is employed for compensation of the deficiency of expansion, and a high pressure is not required.

In cooling of the molded article, the resin is preferably cooled after molding for a shorter time, while the gas is circulated and discharged.

A face material for covering the surface of the molded article in an integrated manner may be applied onto the mold surface prior to molding. That is, the prior application of the face material onto the mold surface provides a fiber-reinforced lightweight multi-layered resin molded article. The face material is not particularly limited thereto, and a variety of materials may be used according to purpose and usage. Usable face materials include, for example, single-layered materials such as woven and non-woven fabrics, thermoplastic resin sheets, films, thermoplastic resin cellular sheets, and films printed with patterns and the like; and multi-layered materials comprising a face material such as thermoplastic elastomer, or vinyl chloride resin, and a lining material such as thermoplastic resin, or thermoplastic resin cellular sheet. In this case, the molded article may be covered entirely or partially with the face material. In manufacture of a multi-layered molded article covered with a face material, depending on the properties of the face material; for example, in the case of a cushion face material or fiber face material, the face material is susceptible to damage due to the pressure of the injected resin under ordinary injection molding. Therefore, there is preferably employed an injection molding method in which resin is injected, in an amount insufficient to fill the volume of a cavity, and a movable core is then advanced so as to compress the resin.

In the manufacturing method of the present invention, as the injection method of injecting a fiber-containing molten resin into the mold cavity, there may be employed an ordinary method as well as a so-called injection compression molding method in which a fiber-containing molten resin is injected into a cavity such that the cavity is incompletely filled with the resin, and a movable core is then advanced for compression of the resin. In the case in which the molded article is molded integrally with a face material of cellular sheets or fabrics, the injection compression molding which uses a low pressure to inject a resin is preferably used, in consideration of prevention of damages to the face material at the time of injection.

Embodiments of modes of the present invention will next be described with reference to the drawings.

Embodiments of First Mode

FIG. 1 schematically shows a first embodiment of the method of manufacturing a fiber-reinforced lightweight resin molded article according to the first mode of the present invention. FIG. 1(A) shows a condition immediately before injection of a fiber-containing molten thermoplastic resin into an injection mold and subsequent expansion of the cavity of the injection mold. FIG. 1(B) shows a condition after expansion of the cavity of the injection mold and before opening of the injection mold, i.e., a condition upon completion of forming of a molded article. In FIG. 1(A), numeral 1 denotes a fixed mold; numeral 2 denotes a moving mold; numeral 3 denotes a movable core; numeral 4 denotes a protruding portion of the moving mold 2; numeral 5 denotes a resin passageway; numeral 6 denotes a cavity; numeral 7 denotes a gas inlet; and numeral 8 denotes a gas outlet. Upon start of the manufacture of the fiber-reinforced lightweight resin molded article of the present mode, the fixed mold 1 and the moving mold 2 having the protruding portion 4 are clamped together. The movable core 3 is advanced into the cavity 6 so as to determine a cavity volume for injection. Specifically, the movable core 3 is advanced to a position where a clearance D1 is defined in the thickness direction of a molded article as shown in FIG. 1(A). In FIG. 1(A), the tip of the protruding portion 4 is aligned with the surface of the movable core 3. However, the positional relationship between the tip and the surface may be determined as appropriate according to an expansion coefficient of a molded article and an expansion coefficient of a portion of a molded article surrounding a grooved portion formed in the molded article. Similarly, the clearance D1 and the shape of the movable core 3 may be determined as appropriate according to the shape and a degree of lightness implementation of a final molded article.

A fiber-containing molten thermoplastic resin is injected from the nozzle of an unillustrated plasticator into the cavity 6 in the above initial state through the resin passageway 5. Cooling of the injected molten resin begins from a portion in contact with the mold. Before the molten resin is completely cooled and hardened, the movable core 3 is retracted as shown in FIG. 1(B). Specifically, the movable core 3 is retracted to a position corresponding to a clearance D2, i.e., to a position where the cavity volume is expanded to form a final molded article. The retraction of the movable core 3 effects springback of entangled fibers which are contained in the molten resin, thereby causing expansion of the molten resin into the shape of the final molded article. In other words, the thus-generated expansion force causes the molten resin to be pressed against the mold surface and to be formed accordingly. During molding, the protruding portion 4 of the moving mold 2 remains still. As a result, a grooved portion corresponding to the protruding portion 4 is formed in the molded article. After cooling, the mold is opened, and the fiber-reinforced lightweight resin molded article is taken out from the mold.

According to the present embodiment, the movable core 3 is advanced into the cavity 6 in the thickness direction of the cavity 6, followed by injection of the molten resin. Then, the movable core 3 is retracted to expand the injected molten resin. Being projected into the cavity 6, the protruding portion 4 functions to cool the molten resin as do the mold surface and the surface of the movable core 3. Cooling of the molten resin, or a reduction in temperature of the molten resin, causes an increase in viscosity of the molten resin. Thus, a cooled region of the molten resin is substantially disabled or limited in its expansion as compared to the remaining region of the molten resin. As a result, the molded article includes a coarse high-expansion region H1 and a dense low-expansion region L1. Because of the presence of the protruding portion 4, the dense region L1 is formed not only along the periphery of the molded article but also along the grooved portion of the molded article. The structure formed of the grooved portion and the surrounding dense region L1 functions like a ribbed structure, thereby yielding an effect which would be yielded by the ribbed structure.

The present embodiment requires injection into the cavity 6 of a molten resin having high expansibility, which depends on a required degree of lightness implementation of a molded article. Thus, as mentioned previously, fibers contained in an injected molten resin; for example, glass fibers, preferably have a long average length. Also, in order to obtain a molded article having a high porosity, a small amount of a foaming agent may be added to the material resin. The foaming agent complements an expansion force induced by springback phenomenon so as to bring the molten resin into close contact with the mold surface, thereby preventing the formation of sink marks. Also, after the movable core 3 starts to retract, gas having a relatively low pressure of not higher than 1 MPa may be introduced into the cavity 6 through the gas inlet 7 while the gas outlet 8 is closed. Alternatively, gas may be released from the gas outlet 8 while a gas pressure at the gas outlet 8 is maintained at a certain level. This promotes cooling of a molded article and prevents the formation of sink marks on the surface of the molded article. In contrast to isolated pores formed through use of a foaming agent for lightness implementation in a conventional method, pores formed in the fiber-reinforced lightweight resin molded article of the present invention are continuous by virtue of springback of entangled fibers which are contained in the molten resin. That is, pores are continuously formed along entangled fibers. Thus, the present invention is characterized in that gas can be introduced into a molded article while homogenizing an expanded portion of the molded article. Through introduction of gas into the molded article, the molded article can be cooled from inside as well, thus significantly shortening a molding cycle. A region of a molded article surrounding the grooved portion, which is formed in a molded article by the protruding portion 4, is of low expansion or non-expansion. In the case where gas is introduced into the cavity 6, pores are preferably formed in a molded article in a continuous manner throughout the molded article for permission of gas flow therethrough while the molded article has a low-expansion region.

Figure 2:
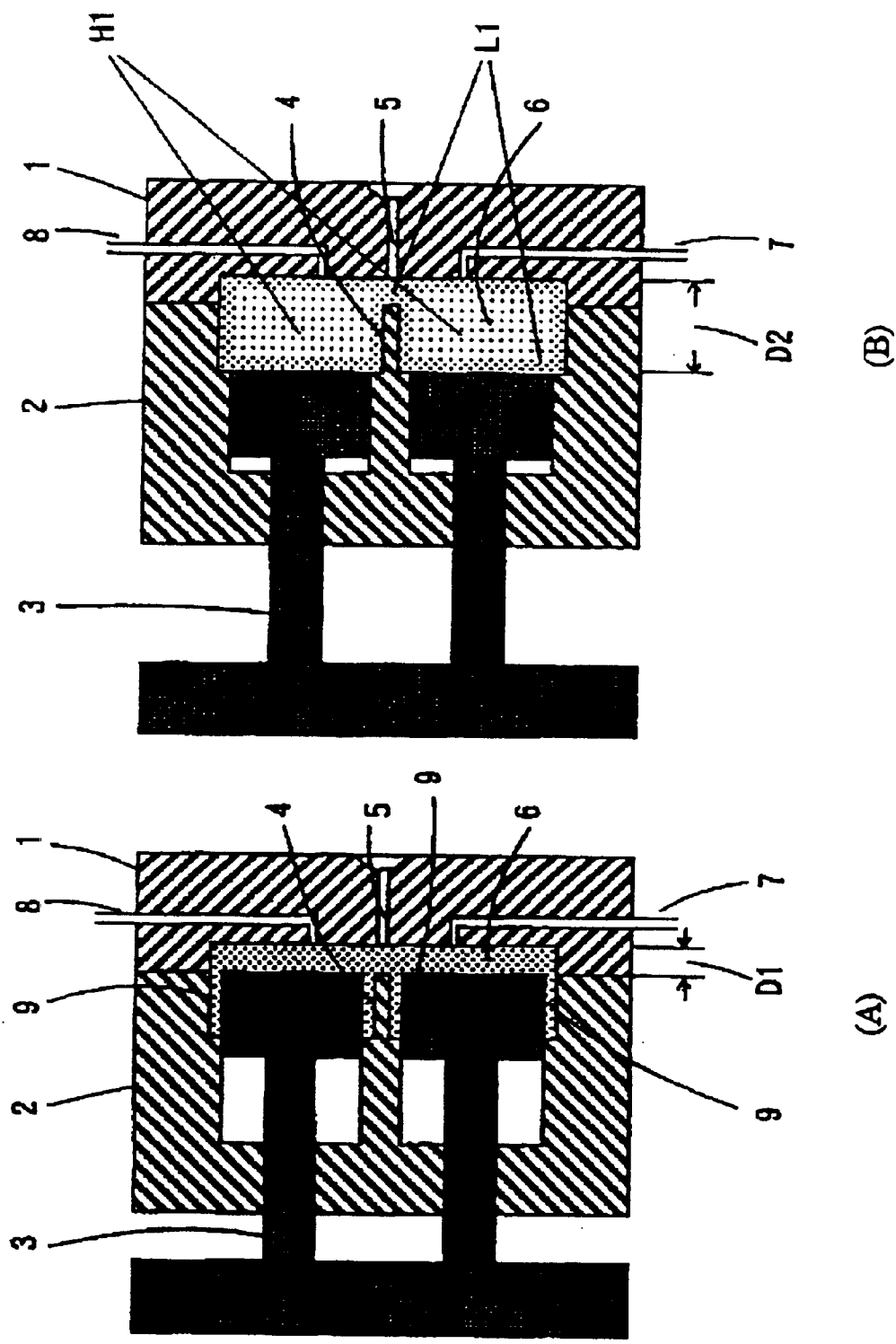

FIG. 2 schematically shows a second embodiment of the method of manufacturing a fiber-reinforced lightweight resin molded article according to the first mode of the present invention. The second embodiment differs from the first embodiment of FIG. 1 in that when the movable core 3 is advanced, a side gap 9 is formed between the moving mold 2 and the movable core 3 and that the cavity 6 into which a molten resin is injected is defined by the mold surface, the surface of the movable core 3, and the surface of the projecting portion 4. Upon injection of a molten resin into the cavity 6, the molten resin is pressed under high pressure against the mold surface to thereby form a major outer surface of a final molded article along the mold surface, and is also subjected to cooling through the mold surface and associated solidification to some degree. Accordingly, when the movable core 3 is retracted, the outer surface, particularly the side surface, of a molded article is free of any adverse effect which would otherwise result from retracting of the movable core 3. The second embodiment imparts better appearance of the side surface to the molded article as compared to the first embodiment of FIG. 1.

Figure 3:
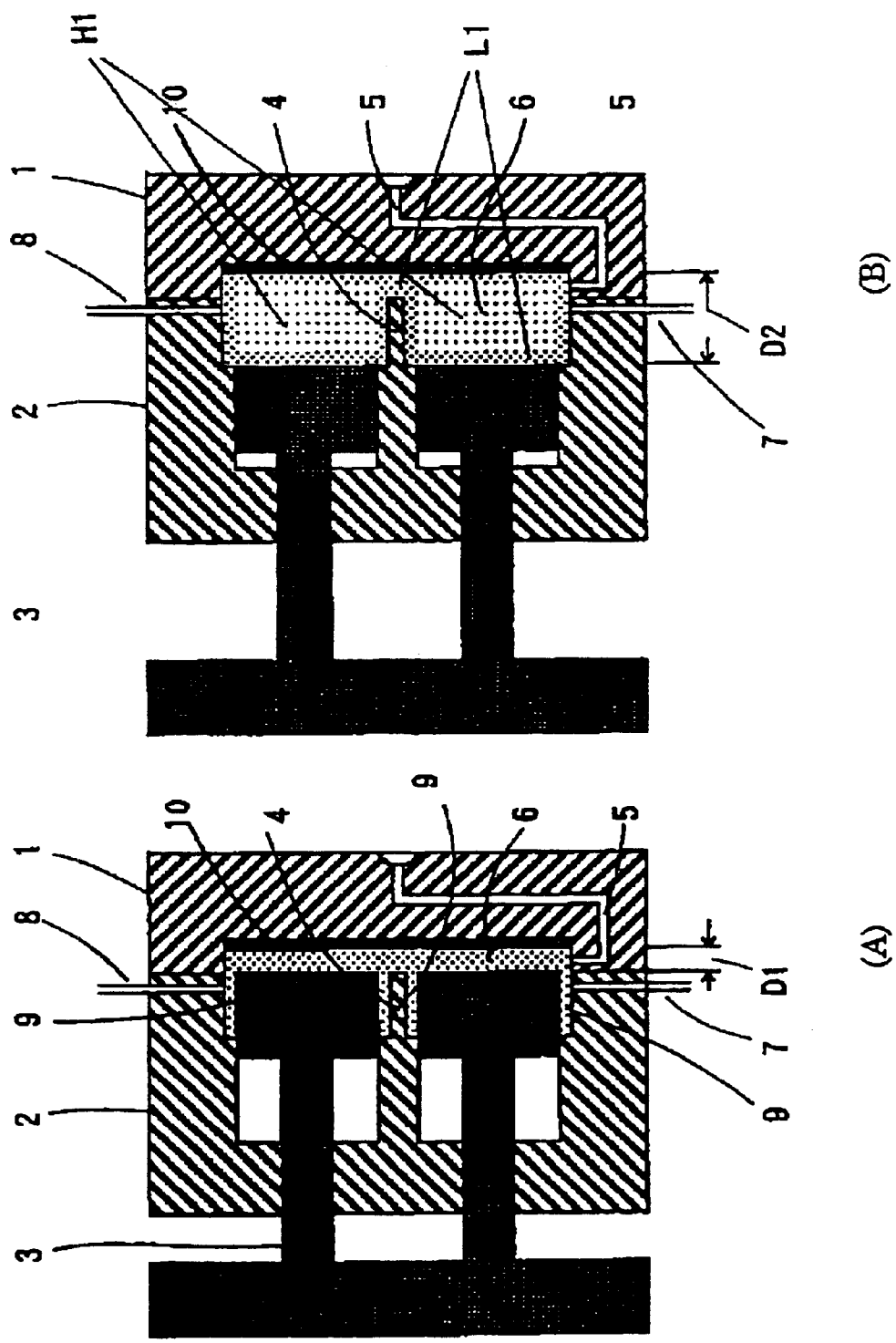

FIG. 3 schematically shows a third embodiment of the method of manufacturing a fiber-reinforced lightweight resin molded article according to the first mode of the present invention. The third embodiment differs from the second embodiment of FIG. 2 in that a face material 10 is previously attached to the surface of the fixed mold 1 opposite the movable core 3. The third embodiment is adapted to manufacture a molded article having the face material 10 integrated therewith. Since the face material 10 is attached to the fixed mold 1, a side injection gate is employed for injection of a molten resin into the cavity 6. A molding method is substantially similar to that of the second embodiment except that the face material 10 is attached to the fixed mold 1; thus, the description thereof is omitted. Notably, in the above-described embodiments, in order to advance and retract the movable core 3, there is disposed, for example, a core-moving apparatus between the moving mold 2 and a moving-mold attachment bed.

Embodiments of Second Mode

Figure 4:
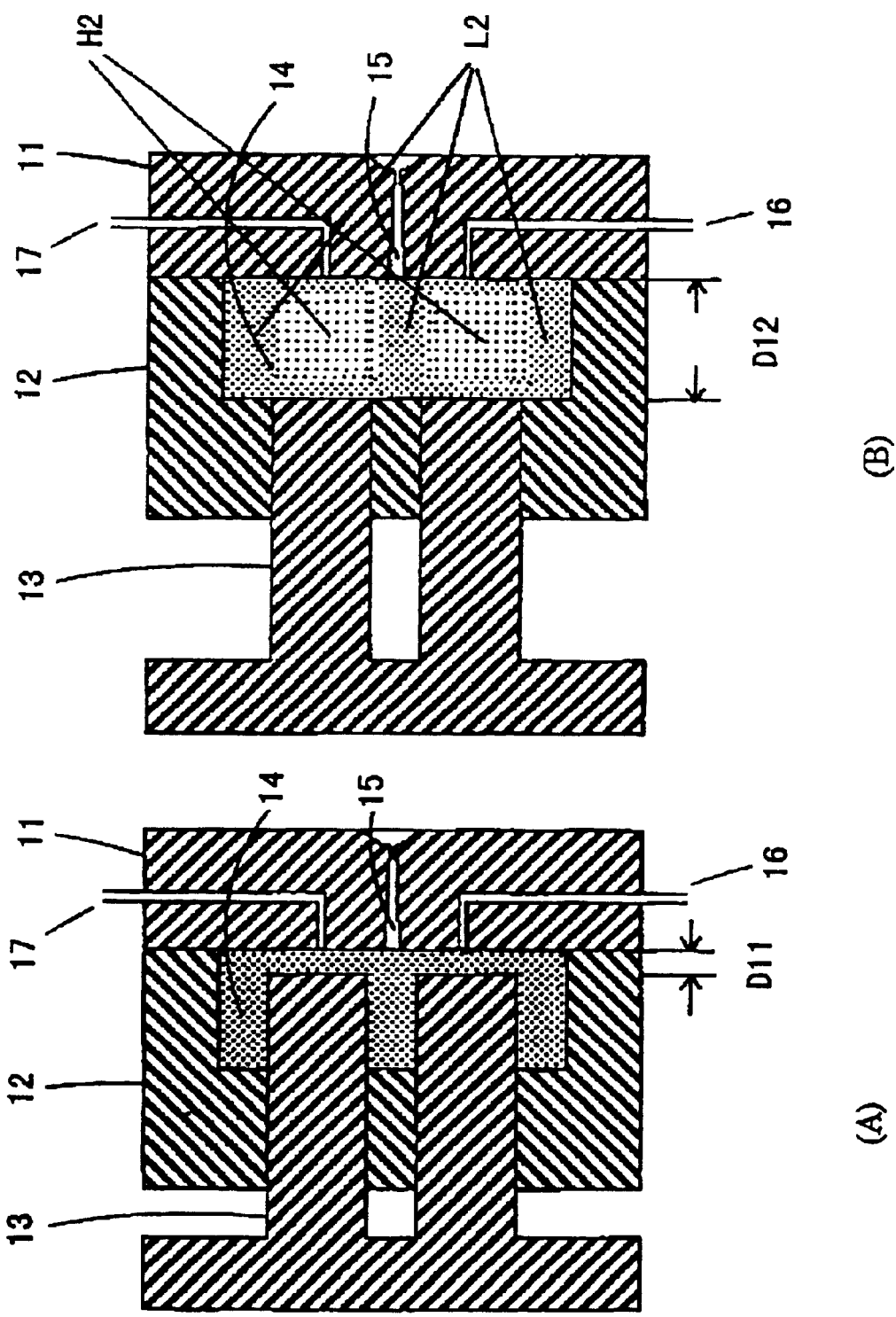

FIG. 4 schematically shows a first embodiment of the method of manufacturing a fiber-reinforced lightweight resin molded article according to the second mode of the present invention. FIG. 4(A) shows a condition immediately before injection of a fiber-containing molten resin into an injection mold and subsequent expansion of the cavity of the injection mold. FIG. 4(B) shows a condition after expansion of the cavity of the injection mold and before opening of the injection mold, i.e., a condition upon completion of forming of a molded article. In FIG. 4(A), numeral 11 denotes a fixed mold; numeral 12 denotes a moving mold; numeral 13 denotes a movable core having a plurality of core heads; numeral 14 denotes a cavity; numeral 15 denotes a resin passageway; numeral 16 denotes a gas inlet; and numeral 17 denotes a gas outlet. Upon start of the manufacture of the fiber-reinforced lightweight resin molded article of the present embodiment, the fixed mold 11 and the moving mold 12 are clamped together. The movable core 13 having a plurality of core heads is advanced into the cavity 14 so as to determine a cavity volume for injection.

Specifically, the movable core 13 is advanced to a position where a clearance D11 is defined in the thickness direction of a molded article as shown in FIG. 4(A). The clearance D1 and the shape of the movable core 13 may be determined as appropriate according to the shape and a degree of lightness implementation of a final molded article. A fiber-containing molten thermoplastic resin is injected from the nozzle of an unillustrated plasticator into the cavity 14 in the above initial state through the resin passageway 15. Cooling of the injected molten resin begins from a portion in contact with the mold. Before the molten resin is completely cooled and hardened, the movable core 13 is retracted as shown in FIG. 4(B). Specifically, the movable core 13 is retracted to a position corresponding to a clearance D12, i.e., to a position where the cavity volume is expanded to form a final molded article. The retraction of the movable core 13 effects springback of entangled fibers which are contained in the molten resin, thereby causing expansion of the molten resin into the shape of the final molded article. In other words, the thus-generated expansion force causes the molten resin to be pressed against the mold surface and to be formed accordingly. After cooling, the mold is opened, and the fiber-reinforced lightweight resin molded article is taken out from the mold.

According to the present embodiment, the movable core 13 having a plurality of core heads is advanced into the cavity 14 in the thickness direction of the cavity 14, followed by injection of the molten resin. Then, the movable core 13 is retracted to expand the injected molten resin. Being projected into the cavity 14, the core heads function to cool the molten resin as does the mold surface. Cooling of the molten resin, or a reduction in temperature of the molten resin, causes an increase in viscosity of the molten resin. Thus, a cooled region of the molten resin is substantially disabled or limited in its expansion as compared to the remaining region of the molten resin. As a result, the molded article includes a coarse high-expansion region H2 and a dense low-expansion region L2. Because of the presence of the core heads, the dense region L2 is formed not only along the periphery of the molded article but also in a central portion of the molded article of FIG. 4(B). The central dense region L2 functions like a ribbed structure, thereby yielding an effect which would be yielded by the ribbed structure.

The present embodiment requires injection into the cavity 14 of a molten resin having high expansibility, which depends on a required degree of lightness implementation of a molded article. Thus, as mentioned previously, fibers contained in an injected molten resin; for example, glass fibers, preferably have a long average length. Also, in order to obtain a molded article having a high porosity, a small amount of a foaming agent may be added to a material resin. The foaming agent complements an expansion force of the injected molten resin so as to bring the molten resin into close contact with the mold surface, thereby preventing the formation of sink marks. Also, after the movable core 13 starts to retract, gas having a relatively low pressure of not higher than 1 MPa may be introduced into the cavity 14 through the gas inlet 16 while the gas outlet 17 is closed. Alternatively, gas may be released from the gas outlet 17 while a gas pressure at the gas outlet 17 is maintained at a certain level. This promotes cooling of a molded article. In contrast to isolated pores formed through use of a foaming agent for lightness implementation in a conventional method, pores formed in the fiber-reinforced lightweight resin molded article of the present invention are continuous by virtue of springback of entangled fibers which are contained in the molten resin. That is, pores are continuously formed along entangled fibers. Thus, the present invention is characterized in that gas can be introduced into a molded article while homogenizing an expanded portion of the molded article. Through introduction of gas into the molded article, the molded article can be cooled from inside as well, thus significantly shortening a molding cycle.

The shape of a low-expansion region and that of a non-expansion region depend on the shape of a core head of the movable core 13. The low-expansion and non-expansion regions may be of independent streaks, continuous streaks, grid, or any other shapes, which depend on the shape of a molded article. In view of introduction of gas into a molded article, pores are preferably formed in the molded article in a continuous manner throughout the molded article for permission of gas flow therethrough while the molded article has a low-expansion region.

Figure 5:
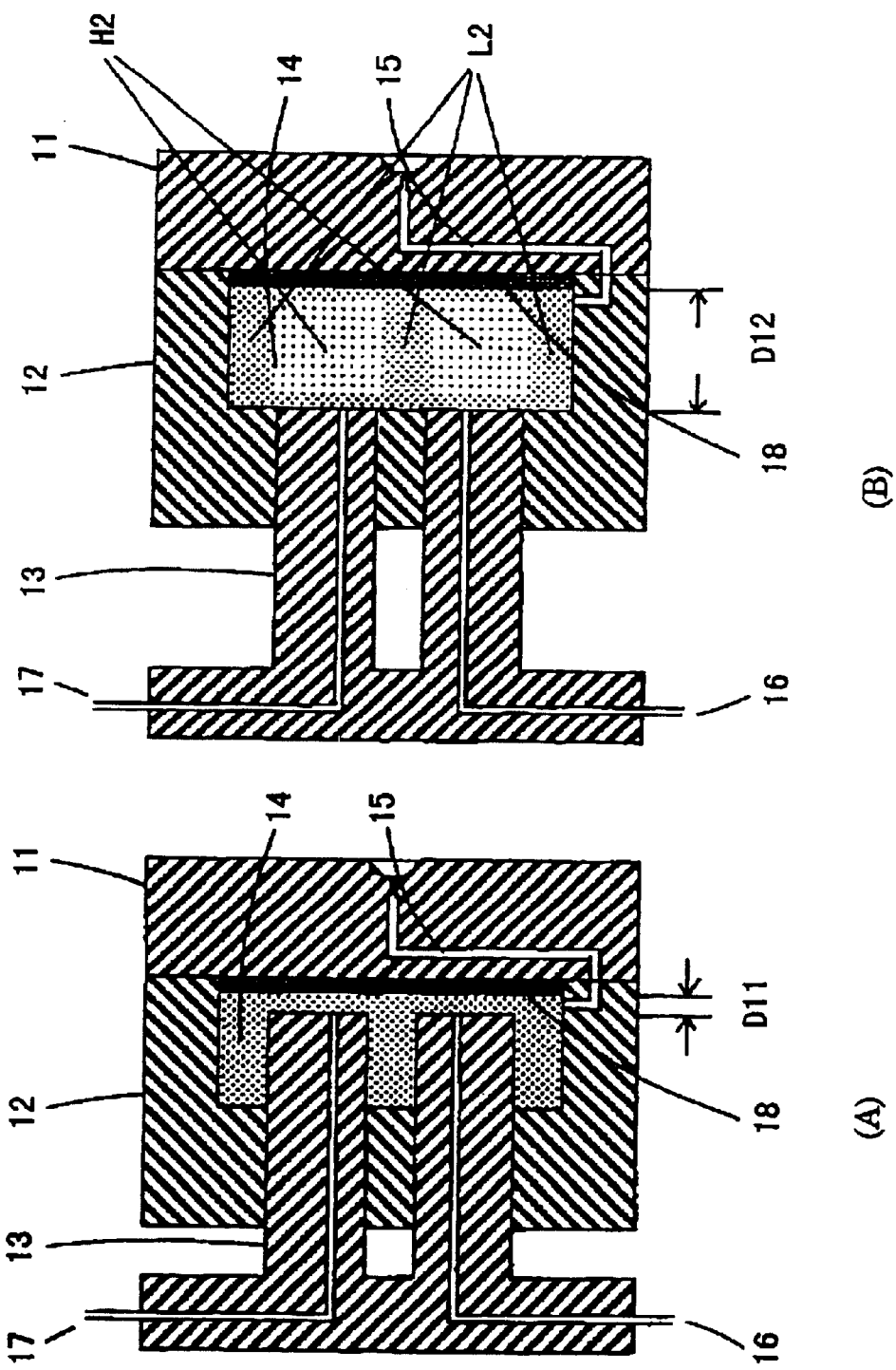

FIG. 5 schematically shows a second embodiment of the second mode of the present invention. As shown in FIG. 5, a face material 18 is previously attached to the surface of the fixed mold 11 opposite the movable core 13 to thereby manufacture a molded article having the face material 18 integrated therewith. Since the face material 18 is attached to the fixed mold 11, a side injection gate is employed for injection of a molten resin into the cavity 14. A molding method is substantially similar to that of the first embodiment except that the face material 18 is attached to the fixed mold 11; thus, the description thereof is omitted. Notably, in the above-described embodiments, in order to advance and retract the movable core 13, there is disposed, for example, a core-moving apparatus between the moving mold 12 and a moving-mold attachment bed.

Embodiments of Third Mode

Figure 6:
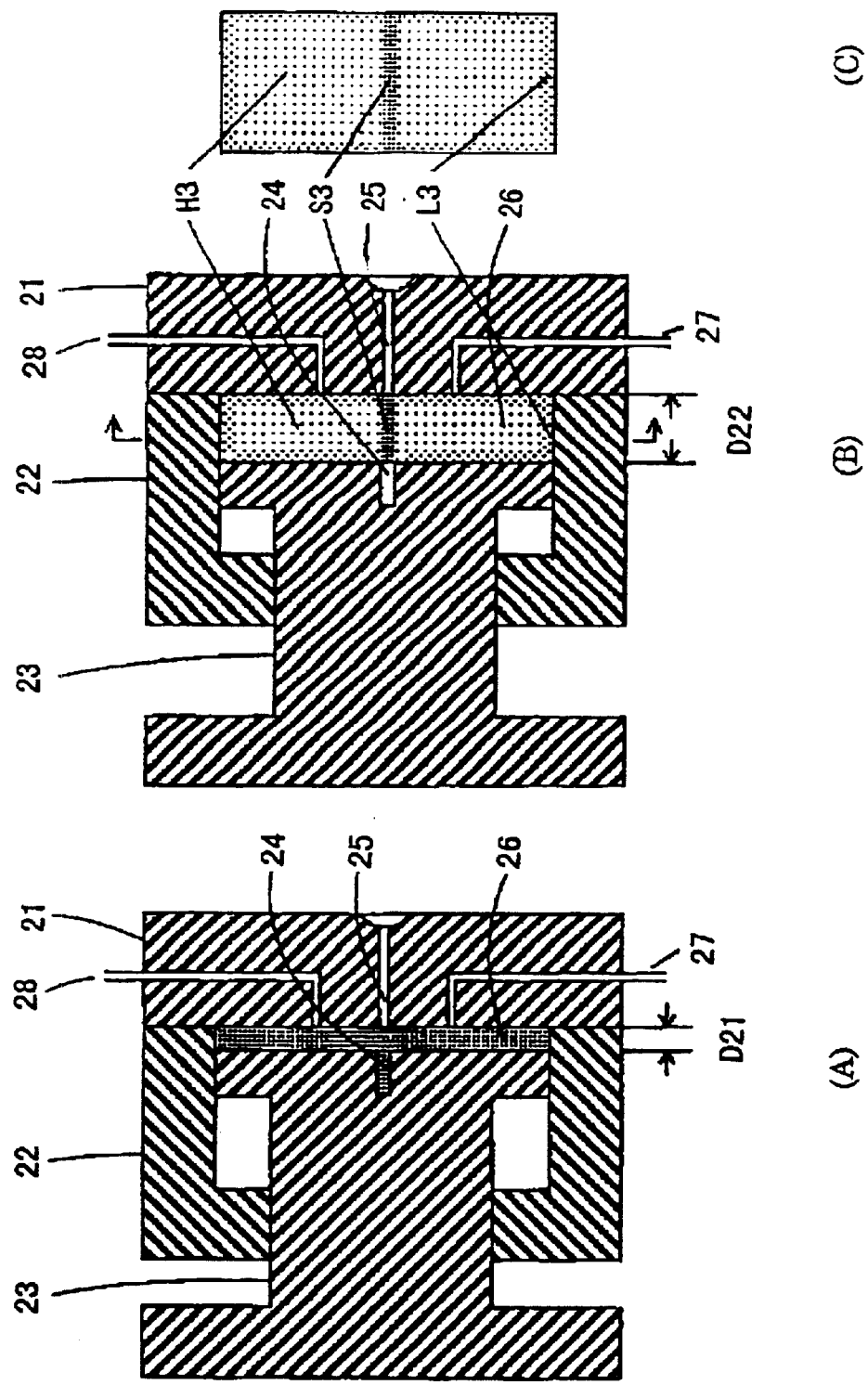

FIG. 6 schematically shows a first embodiment of the method of manufacturing a fiber-reinforced lightweight resin molded article according to the third mode of the present invention. FIG. 6(A) shows a condition immediately before injection of a fiber-containing molten resin into an injection mold and subsequent expansion of the cavity of the injection mold. FIG. 6(B) shows a condition after expansion of the cavity of the injection mold and before opening of the injection mold, i.e., a condition upon completion of forming of a molded article. In FIG. 6(A), numeral 21 denotes a fixed mold; numeral 22 denotes a moving mold; numeral 23 denotes a movable core; numeral 24 denotes a slit formed in the movable core 23; numeral 25 denotes a resin passageway; numeral 26 denotes a cavity; numeral 27 denotes a gas inlet; and numeral 28 denotes a gas outlet. Upon start of the manufacture of the fiber-reinforced lightweight resin molded article of the present embodiment, the fixed mold 21 and the moving mold 22 are clamped together. The movable core 23 is advanced into the cavity 26 so as to determine a cavity volume for injection. Specifically, the movable core 23 is advanced to a position where a clearance D21 is defined in the thickness direction of a molded article as shown in FIG. 6(A). Notably, in FIG. 6(A), the depth of the slit formed in the movable core 23 is identical to the thickness of a final molded article. The clearance D21 and the shape and quantity of the slit may be determined as appropriate according to the shape and a degree of lightness implementation of a final molded article.

A fiber-containing molten resin is injected from the nozzle of an unillustrated plasticator into the cavity 26 in the above initial state through the resin passageway 25. Cooling of the injected molten resin begins from a portion in contact with the mold. Particularly, the molten resin which fills the slit shapes accordingly through quick cooling. Before other dominant molten resin is completely cooled and hardened, the movable core 23 is retracted as shown in FIG. 6(B). Specifically, the movable core 23 is retracted to a position corresponding to a clearance D22, i.e., to a position where the cavity volume is expanded to form a final molded article. The retraction of the movable core 23 effects springback of entangled fibers which are contained in the molten resin, thereby causing expansion of the molten resin into the shape of the final molded article. In other words, the thus-generated expansion force causes the molten resin to be pressed against the mold surface and to be formed accordingly. Accordingly, the resin contained in the slit forms a dense region in which expansion of the resin is substantially suppressed, so that the porosity is low, and substantially no pores are contained. In other words, the dense region forms a rib which connects opposite skin layers. After cooling, the mold is opened, and the fiber-reinforced lightweight resin molded article is taken out from the mold.

According to the present embodiment, the movable core 23 is advanced into the cavity 26 in the thickness direction of the cavity 26, followed by injection or injection-and-compression of the molten resin. There is cooled the molten resin injected into the slit, which serves as part of the cavity 26. Then, the movable core 23 is retracted to expand the injected molten resin. Cooling of the molten resin contained in the slit, or a reduction in temperature of the molten resin, causes an increase in viscosity of the molten resin. Thus, the resin contained in the slit is substantially disabled in its expansion. As a result, the molded article includes a coarse high-expansion region H3 (high-porosity region), a dense peripheral region L3 (middle-porosity region), and a highly dense region S3 (low-porosity region or non-pore region).

The present embodiment requires injection into the cavity 26 of a molten resin having high expansibility, which depends on a required degree of lightness implementation of a molded article. Thus, as mentioned previously, fibers contained in an injected molten resin; for example, glass fibers, preferably have a long average length. Also, in order to obtain a molded article having a high porosity, a small amount of a foaming agent may be added to a material resin. The foaming agent complements an expansion force induced by springback phenomenon so as to bring the molten resin into close contact with the mold surface, thereby preventing the formation of sink marks. Also, after the movable core 23 starts to retract, gas having a relatively low pressure of not higher than 1 MPa may be introduced into the cavity 26 through the gas inlet 27 while the gas outlet 28 is closed. Alternatively, gas may be released from the gas outlet 28 while a gas pressure at the gas outlet 28 is maintained at a certain level. This promotes cooling of a molded article and prevents the formation of sink marks on the surface of the molded article. In contrast to isolated pores formed through use of a foaming agent for lightness implementation in a conventional method, pores formed in the fiber-reinforced lightweight resin molded article of the present invention are continuous by virtue of springback of entangled fibers which are contained in the molten resin. That is, pores are continuously formed along entangled fibers. Thus, the present invention is characterized in that gas can be introduced into a molded article while homogenizing an expanded portion of the molded article. Through introduction of gas into the molded article, the molded article can be cooled from inside as well, thus significantly shortening a molding cycle. In the present invention, pores are preferably formed in a molded article in a continuous manner throughout the molded article for permission of gas flow therethrough while the molded article has a high-expansion region, a low-expansion region, and a non-expansion region.

Figure 7:
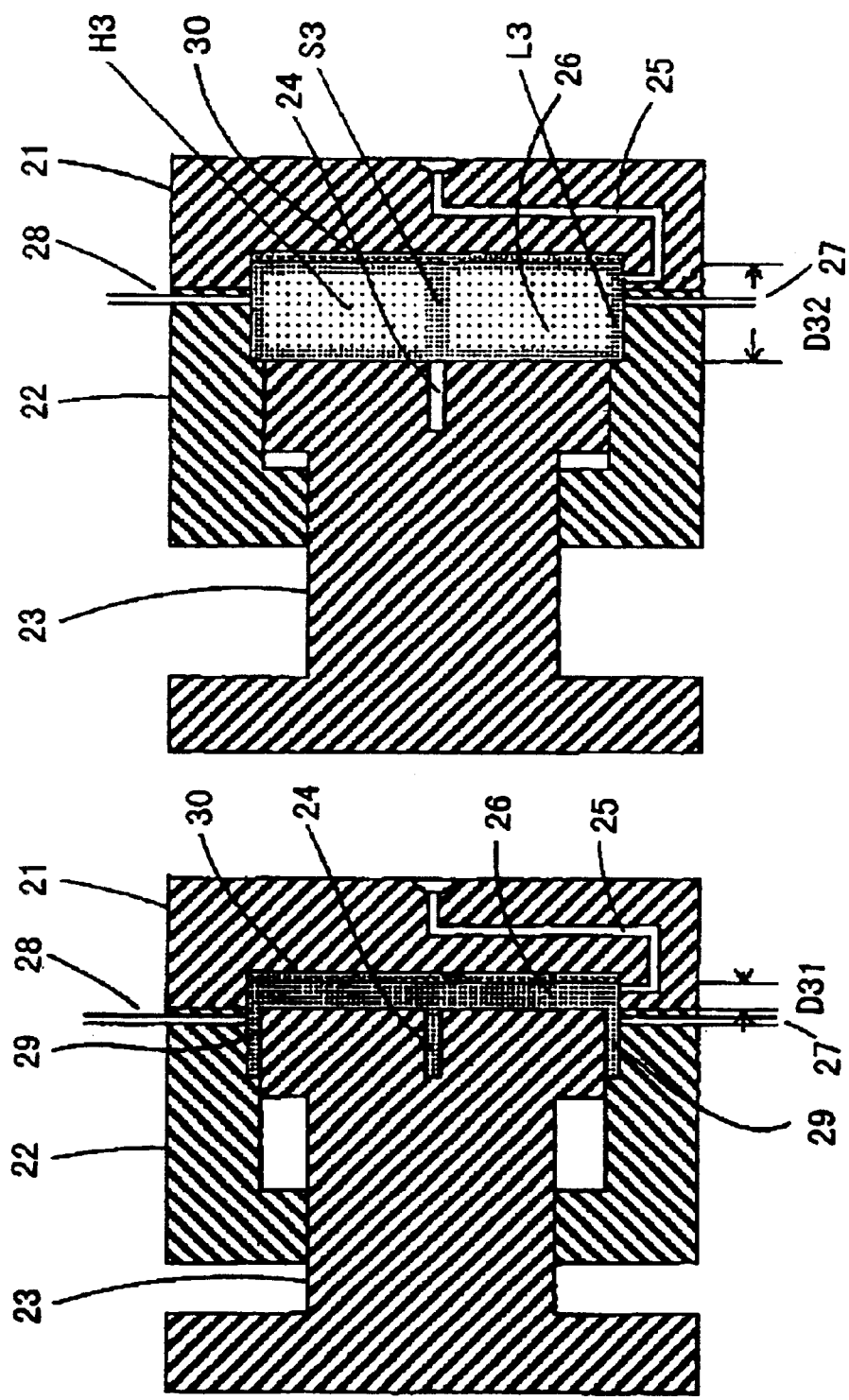

FIG. 7 schematically shows a second embodiment of the method of manufacturing a fiber-reinforced lightweight resin molded article according to the third mode of the present invention. The second embodiment differs from the first embodiment of FIG. 6 in that when the movable core 23 is advanced, a side gap 29 is formed between the moving mold 22 and the movable core 23 and that the cavity 26 into which a molten resin is injected is defined by the mold surface, the surface of the movable core 23, and the slit 24. Upon injection of a molten resin into the cavity 26, the molten resin is pressed under high pressure against the mold surface to thereby form a major outer surface of a final molded article along the mold surface, and is also subjected to cooling through the mold surface and associated solidification to some degree. Accordingly, when the movable core 23 is retracted, the outer surface of a molded article is free of any adverse effect which would otherwise result from retracting of the movable core 23. The second embodiment imparts better appearance of the side surface to the molded article as compared to the first embodiment of FIG. 6. As shown in FIG. 7, a face material 30 is previously attached to the surface of the fixed mold 21 opposite the movable core 23. The second embodiment is adapted to manufacture a molded article having the face material 30 integrated therewith. Since the face material 30 is attached to the fixed mold 21, a side injection gate is employed for injection of a molten resin into the cavity 26. A molding method is substantially similar to that of the first embodiment except that the face material 30 is attached to the fixed mold 21; thus, the description thereof is omitted. Notably, in the above-described embodiments, in order to advance and retract the movable core 23, there is disposed, for example, a core-moving apparatus between the moving mold 22 and a moving-mold attachment bed.

Embodiments of Fourth Mode

Figure 8:
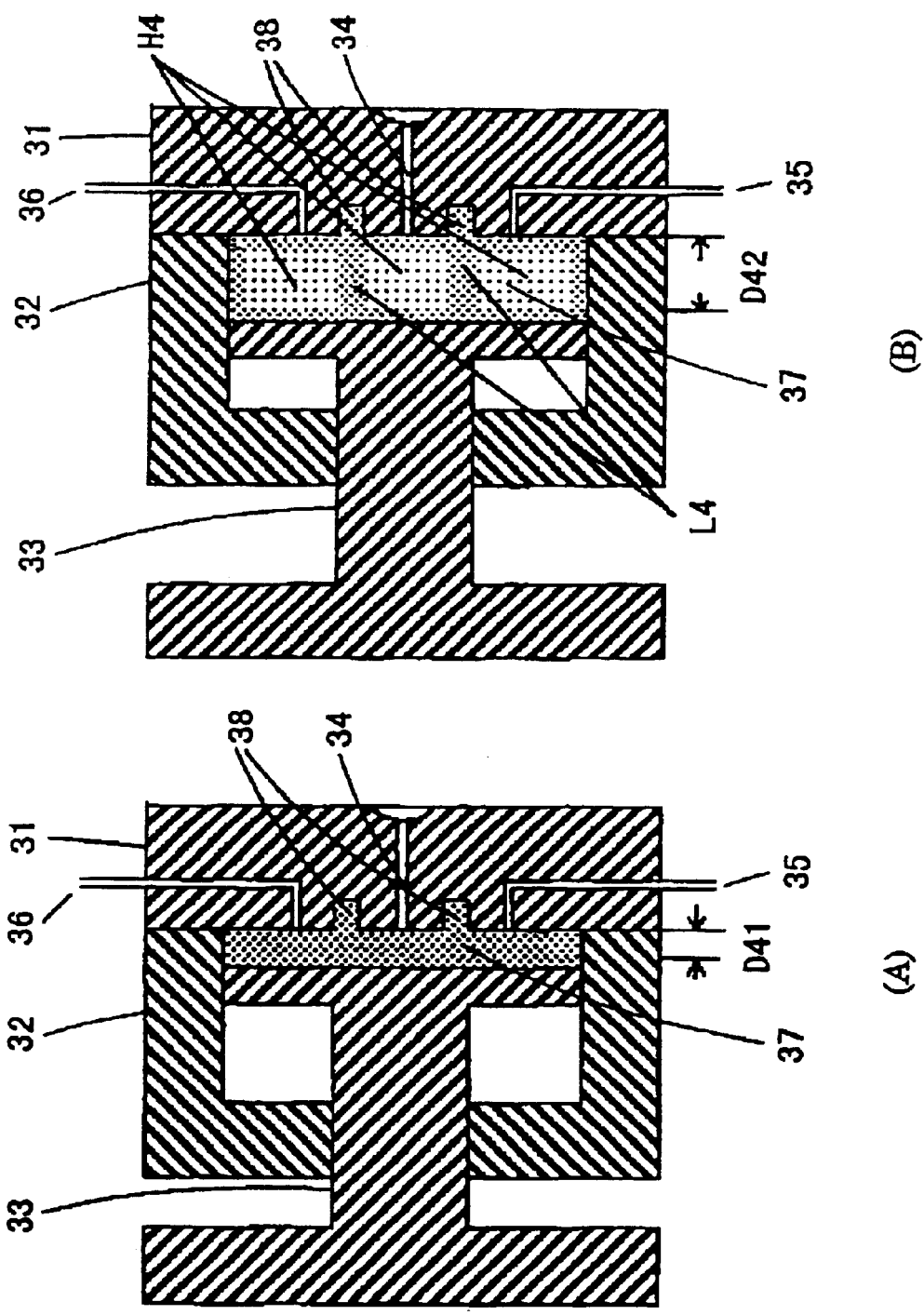

FIG. 8 schematically shows a first embodiment of the method of manufacturing a fiber-reinforced lightweight resin molded article having a protruding portion according to the fourth mode of the present invention. FIG. 8(A) shows a condition immediately before injection of a fiber-containing molten resin into an injection mold and subsequent expansion of the cavity of the injection mold. FIG. 8(B) shows a condition after expansion of the cavity of the injection mold and before opening of the injection mold, i.e., a condition upon completion of forming of a molded article. In FIG. 8, numeral 31 denotes a fixed mold; numeral 32 denotes a moving mold; numeral 33 denotes a movable core; numeral 34 denotes a resin passageway; numeral 35 denotes a gas inlet; numeral 36 denotes a gas outlet; and numeral 37 denotes a cavity. Upon start of the manufacture of the fiber-reinforced lightweight resin molded article having a protruding portion of the present embodiment, the fixed mold 31 having grooved portions and the moving mold 32 are clamped together. The movable core 33 is advanced into the cavity 37 so as to determine a cavity volume for injection. Specifically, the movable core 33 is advanced to a position where a clearance D31 is defined in the thickness direction of a molded article as shown in FIG. 8(A). The clearance D31 and the shape of the movable core 33 may be determined as appropriate according to the shape and a degree of lightness implementation of a final molded article.

A fiber-containing molten thermoplastic resin is injected from the nozzle of an unillustrated plasticator into the cavity 37 in the above initial state through the resin passageway 34. Cooling of the injected molten resin begins from a portion in contact with the mold. Before the molten resin is completely hardened, the movable core 33 is retracted as shown in FIG. 8(B). Specifically, the movable core 33 is retracted to a position corresponding to a clearance D31, i.e., to a position where the cavity volume is expanded to form a final molded article. The retraction of the movable core 33 effects springback of entangled fibers which are contained in the molten resin, thereby causing expansion of the molten resin into the shape of the final molded article. In other words, the thus-generated expansion force causes the molten resin to be pressed against the mold surface and to be formed accordingly. Since the grooved portions of the fixed mold 31 contain an additional molten resin in the thickness direction of a molded article and since the molten resin contained in the grooved portions are cooled quicker than the rest of the molten resin injected into the cavity 37, the molten resin contained in the grooved portions is limited in its expansion during expansion of the cavity 37. As a result, the corresponding protruding portions of a molded article, together with those regions of the molded article which integrally extend from the protruding portions in the thickness direction of the molded article, form rib-like structures, thereby yielding an effect of ribs.

According to the present embodiment, the protruding portions are formed on a molded article in the thickness direction of the molded article. Thus, the protruding portions as well as a skin region of the molded article are limited in its expansion when an injected molten resin is expanded through retraction of the movable core 33. Depending on the shape and size of the protruding portions, the protruding portions and those regions of the molded article which integrally extend from the protruding portions in the thickness direction of the molded article are substantially disabled or limited (i.e., a low porosity) in its expansion as compared to the remaining region of the molten resin. As a result, the molded article includes a general region H4 having a high porosity and a dense region L4 having a low porosity. The dense region L4 is formed not only along the periphery of the molded article but also in the regions which extend from the protruding portions in the thickness direction of the molded article. The dense regions L4 associated with the protruding portions function like a ribbed structure, thereby yielding an effect which would be yielded by the ribbed structure.

The present embodiment requires injection into the cavity 37 of a molten resin having high expansibility, which depends on a required degree of lightness implementation of a molded article. Thus, as mentioned previously, fibers contained in an injected molten resin; for example, glass fibers, preferably have a long average length. Also, in order to obtain a molded article having a high porosity, a small amount of a foaming agent may be added to a material resin. The foaming agent complements an expansion force induced by springback phenomenon so as to bring the molten resin into close contact with the mold surface, thereby preventing the formation of sink marks. Also, after the movable core 33 starts to retract, gas having a relatively low pressure of not higher than 1 MPa may be introduced into the cavity 37 through the gas inlet 35 while the gas outlet 36 is closed. Alternatively, gas may be released from the gas outlet 36 while a gas pressure at the gas outlet 36 is maintained at a certain level. This promotes cooling of a molded article and prevents the formation of sink marks on the surface of the molded article.

In contrast to isolated pores formed through use of a foaming agent for lightness implementation in a conventional method, pores formed in the fiber-reinforced lightweight resin molded article having the protruding portions of the present embodiment are continuous by virtue of springback of entangled fibers which are contained in the molten resin. That is, pores are continuously formed along entangled fibers. Thus, the present invention is characterized in that gas can be introduced into a molded article while homogenizing an expanded portion of the molded article. Through introduction of gas into the molded article, the molded article can be cooled from inside as well, thus significantly shortening a molding cycle. Those regions of the molded article which integrally extend from the protruding portions in the thickness direction of the molded article have a low porosity. In view of introduction of gas into a molded article, pores are preferably formed in the molded article in a continuous manner throughout the molded article for permission of gas flow therethrough while the molded article has the low-porosity regions.

Figure 9:
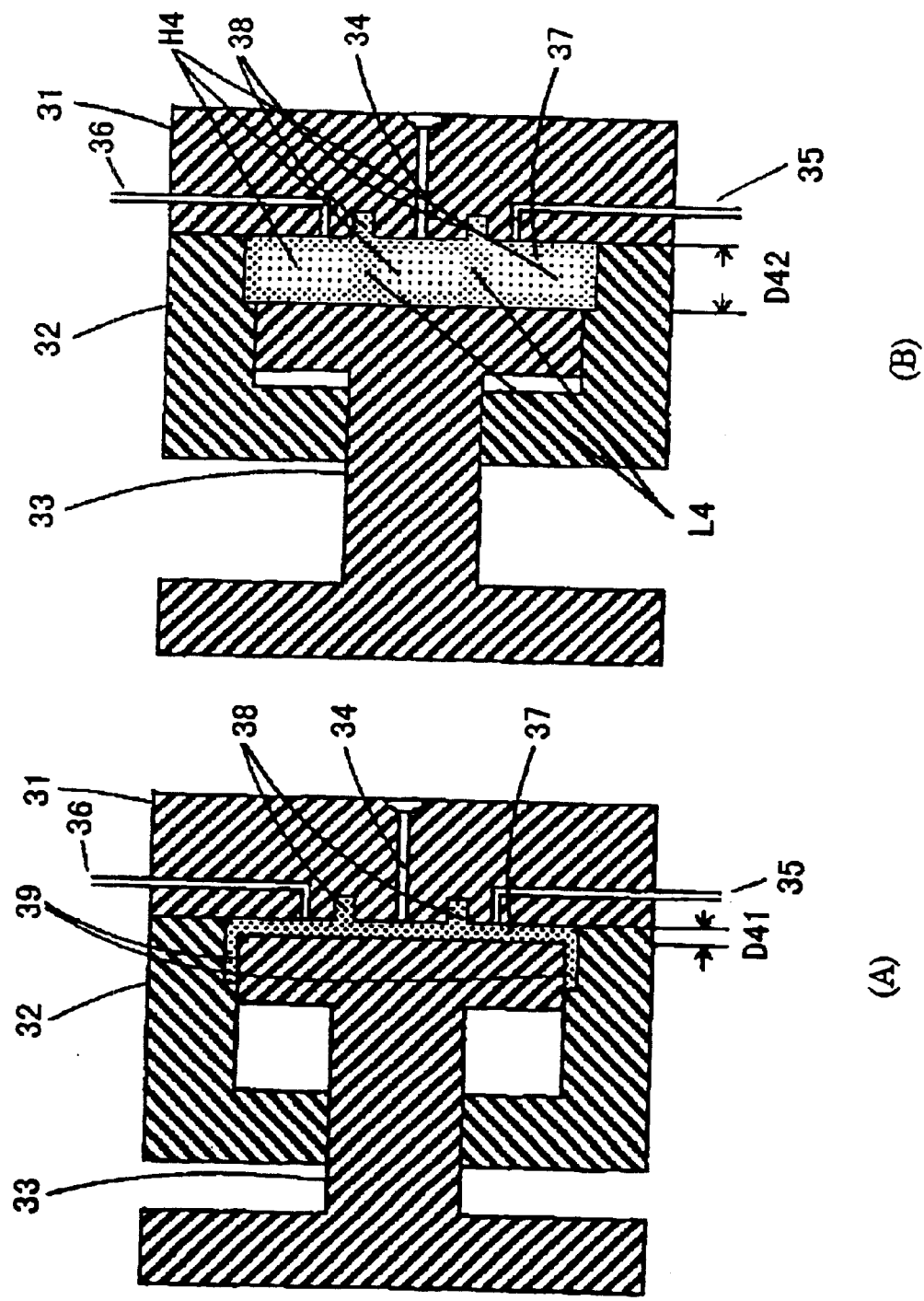

FIG. 9 schematically shows a second embodiment of the method of manufacturing a fiber-reinforced lightweight resin molded article having a protruding portion according to the fourth mode of the present invention. The second embodiment differs from the first embodiment of FIG. 8 in that when the movable core 33 is advanced, a side gap 39 is formed between the moving mold 32 and the movable core 33 and that the cavity 37 into which a molten resin is injected is defined by the surface of the moving mold 32, the surface of the movable core 33, and the surface of the fixed mold 31 having grooved portions formed therein. Upon injection of a molten resin into the cavity 37, the molten resin is pressed under high pressure against the mold surface to thereby form a major outer surface of a final molded article along the mold surface, and is also subjected to cooling through the mold surface and associated solidification to some degree. Accordingly, when the movable core 33 is retracted, the outer surface of a molded article is free of any adverse effect which would otherwise result from retracting of the movable core 33. The second embodiment imparts better appearance of the side surface to the molded article as compared to the first embodiment of FIG. 8.

FIG. 9 schematically shows a third embodiment of the method of manufacturing a fiber-reinforced lightweight resin molded article having a protruding portion according to the fourth mode of the present invention. The third embodiment differs from the second embodiment of FIG. 8 in that a face material 40 is previously attached to the surface of the fixed mold 31 opposite the movable core 33. The third embodiment is adapted to manufacture a molded article having the face material 40 integrated therewith. A molding method is substantially similar to that of the first embodiment except that the face material 40 is attached to the fixed mold 31; thus, the description thereof is omitted.

Figure 10:
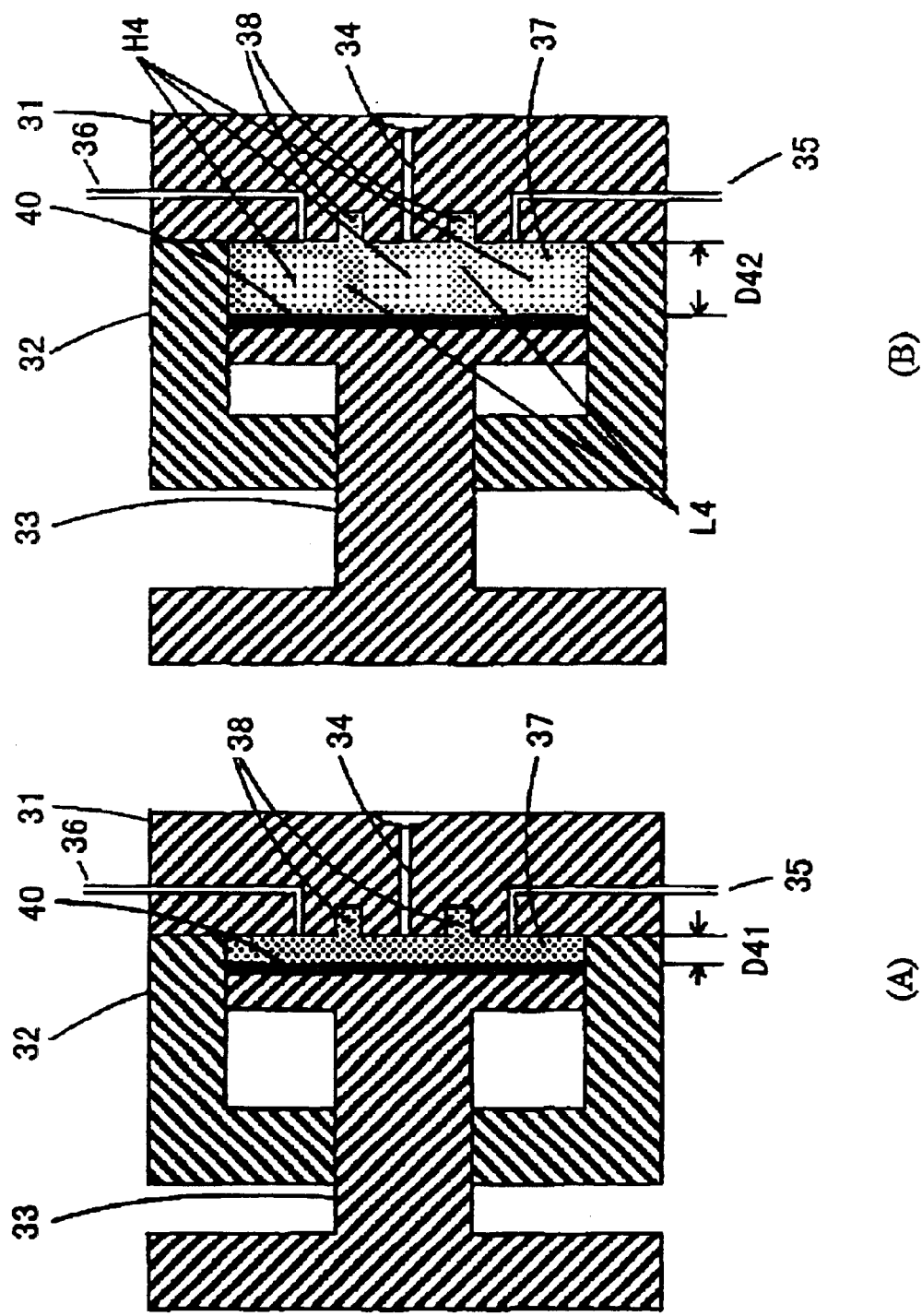

FIG. 10 schematically shows a fourth embodiment of the method of manufacturing a fiber-reinforced lightweight resin molded article having a protruding portion according to the fourth mode of the present invention. As shown in FIG. 10, grooved portions are formed in the moving mold 32; the moving mold 32 has a function of a movable core; and an auxiliary mold 41 biased by a spring 42 is employed. The cavity 37 into which a molten resin is injected is defined by the fixed mold 31 and the moving mold 32, which are clamped together, and the auxiliary mold 41. The mold structure of the present embodiment is simplified through elimination of a movable core. Also, the present embodiment improves the appearance of the side surface of a molded article. FIG. 10(C) is a sectional view of the molded article of FIG. 10(B) and schematically shows a dense region L4 having a low porosity and a coarse region H4 having a high porosity. In FIG. 10, the resin passageway employs a direct gate. However, through employment of a side gate, the top surface of the molded article of FIG. 10(B) can have better appearance, and as needed, a face material can be integrally attached to the top surface to thereby form a laminated molded article. Notably, in the above-described embodiments except that of FIG. 10, in order to advance and retract the movable core 33, there is disposed, for example, a core-moving apparatus between the moving mold 32 and a moving-mold attachment bed.

EXAMPLES

Next, the advantages and effects of the present invention will be specifically described by way of example. However, the present invention is not limited thereto.

Examples 1 and 2 described below are drawn to embodiments according to the first mode of the present invention.

Example 1

Glass fiber-reinforced polypropylene pellets (65 parts by weight) (containing 3 wt. % maleic anhydride-polypropylene) comprising parallel-arranged glass fibers having a length of 12 mm in the amount of 60 wt. %, and polypropylene pellets (35 parts by weight) having a melt index of 30 g/10 min (MI: 230° C., under load of 2.16 kg) were dry blended, to thereby obtain molding material. An injection molding machine (clamping force: 850 t) comprising a screw having a compression ratio of 1.9 was employed in order to reduce the incidence of rupturing of the glass fibers. As shown in FIG. 2(A), while a movable core 3 having protruding portions was thrust into a cavity 6 for clamping (a clearance D1 between a fixed mold and the protruding portions of the movable core was 4 mm), the molding material was plasticized, weighed, and injected into the cavity. Two seconds after completion of charging of the molding material, the movable core 3 was retracted to the position as shown in FIG. 2(B) so that the molding material was extended, expanded, and cooled, to thereby obtain a plate-shaped (600 mm×300 mm) molded article having a thickness (D2) of 8 mm (a grooved portion: 4 mm×6 mm×240 mm). The molded article was cut out, and the expansion was measured, showing an expansion coefficient of 2.0 at a high-expansion portion (H1). Also, the molded article was incinerated, and the mean fiber length of the remaining fibers was measured, and found to be 7.2 mm. The inner circumferential edge, peripheral edge, and surfaces of these edges of the grooved portion were formed of a dense layer having substantially no expansion. Especially, the grooved portion has a function of a rib.

Example 2

Molding was performed by use of the molding material and injection molding machine used in Example 1, and the molds as shown in FIG. 3. A face material (ten-fold foamed polypropylene/polyvinyl chloride leather: 2 mm) was applied onto the surface of a fixed mold as shown in FIG. 3(A), while a movable core was thrust; a molten resin was injected while a clearance excluding the thickness of the face material (D1) was adjusted to 2 mm; and the movable core was retracted to the position where a thickness (D2) shown in FIG. 3(B) excluding the thickness of the face material is 12 mm so that the molten resin was extended and expanded. Two seconds after the start of the retracting of the movable core, nitrogen gas was charged, through a gas pin, under pressure of 0.8 MPa for 30 seconds. After cooling, the molds were opened, and a plate-shaped (12 mm (excluding the thickness of the face material)×600 mm×300 mm) molded article with the face material (a grooved portion: 10 mm×8 mm×250 mm) was removed. The molded article was cut out, and the expansion was measured, and an expansion coefficient of about 6 was found at a high-expansion portion (H1). Also, the molded article was incinerated, and the mean fiber length of the remaining fibers was measured, and found to be 6.9 mm. The inner circumferential edge, peripheral edge, and surfaces of these edges of the grooved portion were formed of a strong layer having substantially no expansion. Especially, the grooved portion has a function of a rib.

Examples 3–7 and Comparative Example 1 described below are examples according to the second mode of the present invention.

Example 3

Glass fiber-reinforced polypropylene pellets (65 parts by weight) (containing 3 wt. % maleic anhydride-polypropylene) comprising parallel-arranged glass fibers having a length of 12 mm in the amount of 60 wt. %, and polypropylene pellets (35 parts by weight) having a melt index of 30 g/10 min (MI: 230° C., under load of 2.16 kg) were dry blended, to thereby obtain molding material. An injection molding machine (clamping force: 850 t) comprising a screw having a compression ratio of 1.9 was employed in order to reduce the incidence of rupturing of the glass fibers. As shown in FIG. 4(A), while a movable core 13 was thrust into a cavity 14 for clamping (a clearance D11 between a fixed mold and the protruding portions of the movable core was 4 mm), the molding material was plasticated, weighed, and injected into the cavity. Two seconds after completion of charging of the molding material, the movable core 13 was retracted to the position as shown in FIG. 4(B) so that the molding material was extended, expanded, and cooled, to thereby obtain a molded article having a thickness (D12) of 12 mm. The molded article was cut out, and the expansion was measured, showing that the portion of the molded article corresponding to the area which the movable portion of the movable core had been retracted was sufficiently expanded, but the circumferential portion and the portion which had been pressed by the movable core at the time of clamping exhibited a low expansion coefficient (about 1.2) due to the cooling effect exerted by the mold, so that they subsequently formed ribs.

Example 4

The preparation of molding material in Example 3 was repeated except that a foaming agent (0.3 parts by weight) (EV-306G; manufactured by Eiwa Chemical Industry, Co., Ltd.) (in the form of a master batch containing 30 wt. % foaming agent) was added to a mixture of the glass fiber-reinforced polypropylene pellets (50 parts by weight) and polypropylene pellets (50 parts by weight) having a MI of 30 g/10 min. The molding in Example 3 was repeated except that the clearance (D11) was set to 3 mm when the movable core was thrust. The molded article was cut out, and the expansion was measured, showing that the portion of the molded article corresponding to the area which the movable portion of the movable core had been retracted was sufficiently expanded, but the circumferential portion and the portion which had been pressed by the movable core at the time of clamping exhibited a low expansion coefficient (about 1.2) due to the cooling effect exerted by the mold, so that they substantially formed rib structures.

Example 5

The procedure of Example 3 was repeated except that the clearance (D11) was set to 2 mm when the movable core was thrust, a gas outlet was closed two seconds after the start of retracting of the movable core, and nitrogen gas was charged under a low pressure of 0.8 MPa. The molded article was cut out, and the expansion was measured, showing that the portion of the molded article corresponding to the area which the movable portion of the movable core had been retracted was sufficiently expanded, but the circumferential portion and the portion which had been pressed by the movable core at the time of clamping exhibited a low expansion coefficient (about 1.2) due to the cooling effect exerted by the mold, so that they substantially formed rib structures.

Comparative Example 1

The procedure of Example 3 was repeated except that glass fiber-reinforced polypropylene pellets comprising parallel-arranged short glass fibers (percentage of glass fiber: 40 wt. %) having a mean length of 0.4 mm was used as molding material. However, a slight ripple was found at the tip end of the movable core, and substantially no expansion was caused at the portion corresponding to the are which the movable portion of the movable core had been retracted.

Example 6

Molding was performed by use of the molding material and injection molding machine used in Example 3, and the molds as shown in FIG. 5. A face material (ten-fold foamed polypropylene/polyvinyl chloride resin leather: 2 mm) was applied on the surface of a fixed mold as shown in FIG. 5(A) while a movable core was thrust; a molten resin was injected while a clearance excluding the thickness of the face material (D1) was adjusted to 4 mm; and the movable core was retracted to the position where a thickness (D2) shown in FIG. 5(B) excluding the thickness of the face material was 12 mm so that the molten resin was extended and expanded. The. molded article was cut out, and the expansion was measured, showing that the portion of the molded article corresponding to the area which the movable portion of the movable core had been retracted was sufficiently expanded, but the circumferential portion and the portion which had been pressed by the movable core at the time of clamping exhibited a low expansion coefficient (about 1.1) due to the cooling effect exerted by the mold, so that they substantially formed rib structures. Also, when the molded article integrally molded with a face material was bent, it exhibited very good rigidity. Further, when the molded article was partially compressed, no dents were formed in the face material.

Example 7

The molding of Example 6 was repeated except that a face material (same as in Example 4:3 mm) was applied onto the surface of a fixed mold as shown in FIG. 2(A) while a movable core was thrust; a molten resin was injected while a clearance excluding the thickness of the face material (D11) was adjusted to 2 mm; and the movable core was retracted to the position where a thickness (D12) shown in FIG. 4(B) excluding the thickness of the face material was 12 mm so that the molten resin was extended and expanded. Two seconds after the start of the retraction of the movable core, nitrogen gas was charged through a gas pin under pressure of 0.1 MPa. There were no sink marks on the surface of the molded article. The molded article was cut out, and the expansion was measured, showing that the portion of the molded article corresponding to the area which the movable portion of the movable core had been retracted was sufficiently expanded, but the circumferential portion and the portion which had been pressed by the movable core at the time of clamping exhibited a low expansion coefficient (about 1.1) due to the cooling effect exerted by the mold, so that they substantially formed rib structures. Also, when the molded article integrally molded with a face material was bent, it exhibited very good rigidity. Further, when the molded article was partially compressed, no dents were formed in the face material.

Examples 8–10 and Comparative Examples 2 and 3 described below are examples according to the third mode of the present invention.

Glass fiber-reinforced polypropylene pellets (70 parts by weight) (containing 3 wt. % maleic anhydride-polypropylene) comprising parallel-arranged glass fibers having a length of 12 mm in the amount of 70 wt. %, and polypropylene pellets (30 parts by weight) having a melt index of 30 g/10 min (MI: 230° C., under load of 2.16 kg) were dry blended, to thereby obtain molding material. An injection molding machine (clamping force: 850 t) comprising a screw having a compression ratio of 1.9 was employed in order to reduce the incidence of rupturing of the glass fibers. As shown in FIG. 6(A), while a movable core 23 having a slit 24 (width: 2 mm, depth: 7 mm) was thrust into a cavity 26 for clamping (D21: 5 mm), the molding material was plasticated, weighed, and injected into the cavity. Three seconds after completion of charging of the molding material, the movable core 23 was retracted to the position as shown in FIG. 6(B) so that the molding material was extended, expanded, and cooled, to thereby obtain a plate-shaped (600 mm×300 mm) molded article having a thickness (D22) of 12 mm. The molded article was cut out, and the expansion was measured, showing a porosity of about 58% at a high-expansion portion (H3) and substantially no pores at the slit portion. Also, the molded article was incinerated, and the mean fiber length of the remaining fibers was measured, and found to be 7.3 mm. The unexpanded portion of the slit portion had a rib structure which bridges the two skin layers.

Example 9

A molded article similar to that obtained in Example 8 was molded by use of the molding material and injection molding machine as used in Example 8, and the molds as shown in FIG. 7; however, the face material as shown in FIG. 7 was not used in this example. A gap 29 between a movable core 23 and a moving mold 22 was adjusted to 3 mm, while the movable core having a slit 4 (width: 2 mm, depth: 9 mm) was thrust; a fiber-containing molten resin in the amount corresponding to the gap of 3 mm was injected, while a cavity clearance (D21: 4 mm) was increased by 2 mm; and the movable core was advanced so as to compress-charge the resin. Three seconds after completion of the compression, the movable core was retracted to the position where a cavity clearance D22 is 12 mm so as to extend and expand the resin. Meanwhile, two seconds after the start of retracting of the movable core, nitrogen gas was charged through a gas pin at 1 MPa into the molten resin. After cooling, the molds were opened, and the molded article was removed. The molded article was cut out, and the expansion was measured, showing a porosity of about 75% at a high-expansion portion (H3), and substantially no expansion or pores at the slit portion. Also, there were conspicuous unexpanded layers found at the peripheral edge of the molded article. Also, the molded article was incinerated, and the mean fiber length of the remaining fibers was measured, resulting in a value of 6.9 mm.

Example 10

A resin molded article integrally molded with a face material was molded by use of the molding material, the injection molding machine and a similar molded article as used in Example 8, and the mold as shown in FIG. 7. A face material (ten-fold foamed polypropylene/polyvinyl chloride leather: 3 mm) was applied onto the surface of a fixed mold as shown in FIG. 7(A), while a movable core was thrust; a fiber-containing molten resin in the amount corresponding to the clearance of 3 mm (D21) was injected, while a cavity clearance excluding the thickness of the face material was adjusted to 12 mm; and the movable core was advanced so as to compress the resin. Two seconds after compression-charging, the movable core was retreated to the position where a thickness (D22) shown in FIG. 7(B) excluding the thickness of the face material is 12 mm so as to extend and expand the resin. After cooling, the molds were opened, and a plate-shaped molded article having a thickness of 15 mm (excluding the thickness of the face material) with the face material thereon was obtained. The molded article was cut out, and the expansion was investigated, showing a porosity of about 75% at a high-expansion portion (H3) and substantially no pores at the slit portion. Also, the face material was excellently integrated with the body portion, with the back surface being smooth and no warping, proving that the product was an excellent lightweight molded product. Also, there were conspicuous unexpanded layers found at the peripheral edge of the molded article. Also, the molded article was incinerated, and the mean fiber length of the remaining fibers was measured, resulting in a value of 8.3 mm.

Comparative Example 2

The procedure of Example 8 was repeated except that resin pellets comprising glass fibers having a mean length of 0.4 mm in an amount of 40 wt. % was used as raw material resin. However, no molded article was obtained since no expansion was caused.

Comparative Example 3

The procedure in Example 8 was repeated except that a foaming agent (6 parts by weight) (EV-306G; manufactured by Eiwa Chemical Industry, Co., Ltd.) (in the form of a 20 parts by weight of a master batch containing 30 wt. % foaming agent) was added to material pellets (100 parts by weight)., resulting a plate-shaped molded article. The molded article was cut out, and the expansion was investigated, showing that the high-expansion portion (H3) had a porosity of about 47% and a portion corresponding to the slit portion had a porosity of about 15%. In addition, there were observed silver marks due to running of gas over the entirety of the surface, and standing waves due to insufficient cooling.

Examples 11–12 described below are examples according to a fourth aspect of the present invention.

Example 11

Glass fiber-reinforced polypropylene pellets (65 parts by weight) (containing 3 wt. % maleic anhydride-polypropylene) comprising parallel-arranged glass fibers having a length of 12 mm in the amount of 60 wt. %, and polypropylene pellets (35 parts by weight) having a melt index of 30 g/10 min (MI: 230° C, under load of 2.16 kg) were dry blended, to thereby obtain molding material. An injection molding machine (clamping force: 850 t) comprising a screw having a compression ratio of 1.9 was employed in order to reduce the incidence of rupturing of the glass fibers. As shown in FIG. 8(A), while a movable core 33 was thrust into a cavity 7 toward a fixed mold 31 having depressed portions (depth: 3 mm) for clamping (a clearance (D31) within the cavity 7 was 3 mm), the molding material was plasticated, weighed, and injected into the cavity. Two seconds after completion of charging of the raw resin material, the movable core 33 was retreated to the position (D32) as shown in FIG. 8(B) so as to extend and expand the molding material. After cooling, there were obtained two plate-shaped (300 mm×600 mm) molded articles having a thickness of 9 mm (a protruding portion: 3 mm (height)×300 mm×20 mm). The molded article was cut out, and formation of pores was investigated, showing that a flat portion (H4) had a porosity of about 67% and a region (L4) corresponding to the protruding portion had a porosity of about 26% indicating a dense structure. The molded article was incinerated, and the mean fiber length of the remaining fibers was measured, resulting in a value of 7.2 mm. The molded article had excellent surface appearance, high rigidity, and high resistance to buckling.

Example 12

Figure 11:
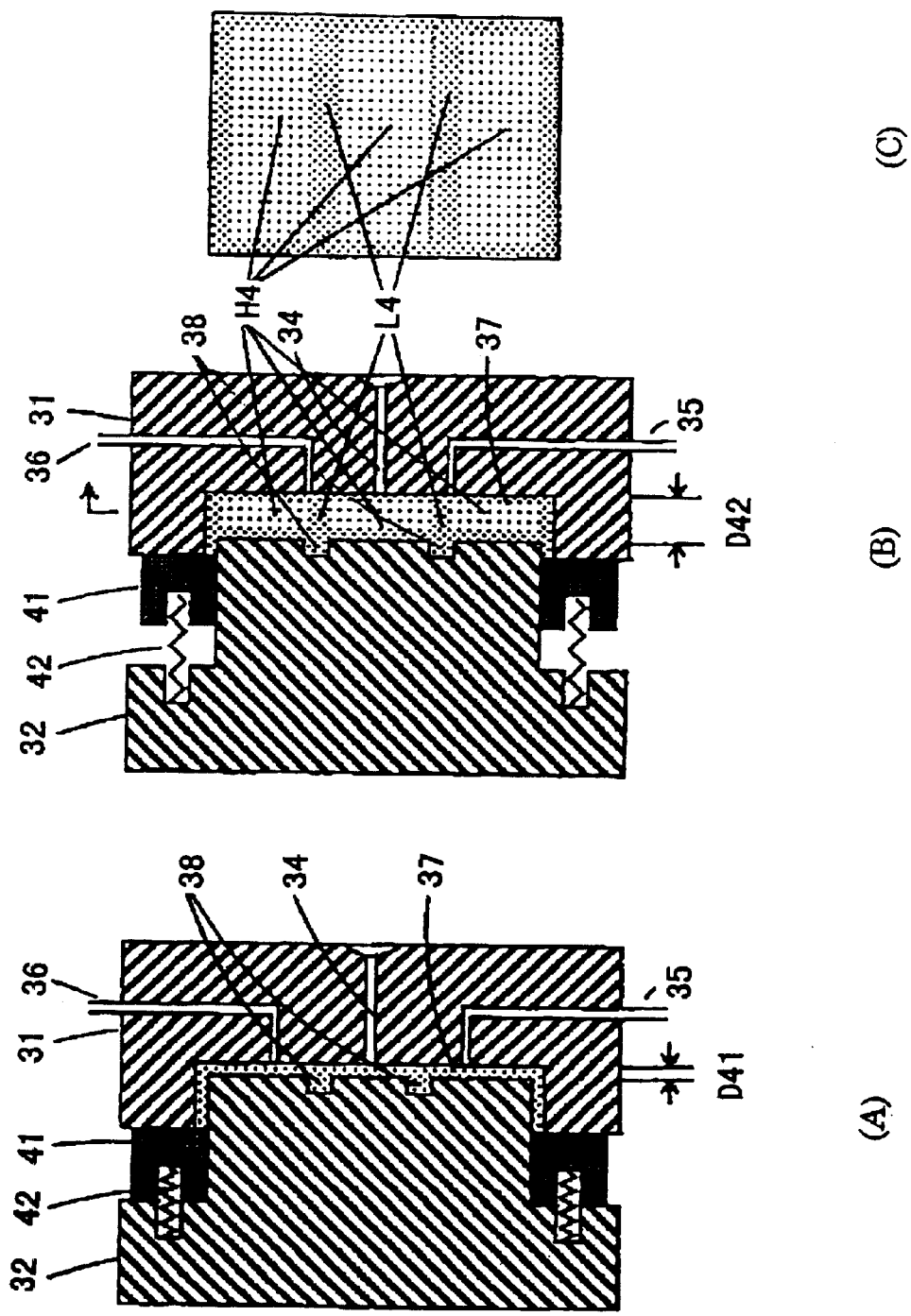

A resin molded article integrally molded with a face material was molded by use of the molding material and injection molding machine as used in Example 11, and the molds as shown in FIG. 10. A face material (ten-fold foamed polypropylene/polyvinyl chloride leather: 2 mm) was applied onto the surface of a movable core 33; a fiber-containing molten resin in the amount corresponding to the gap of 3 mm was injected, while a cavity clearance was adjusted to 10 mm; and 2 seconds after starting of injection, the movable core 33 was advanced so as to compress the resin (FIG. 11(A)). Two seconds after the compression, the movable core 33 was retreated to the position where a thickness (D32) shown in FIG. 10(B) was 12 mm so as to extend and expand the resin. Meanwhile, 1.5 seconds after the start of the retreat of the movable core, nitrogen gas was charged, through a gas pin, under pressure of 0.8 MPa for 40 seconds. After cooling, the molds were opened, to thereby obtain two plate-shaped (300 mm×600 mm) molded articles having a thickness of 12 mm (excluding the thickness of the face material) (the protruding portion: 3 mm (height)×300 mm×20 mm). The molded article was cut out, and formation of pores was investigated, showing that a flat portion (H) had a porosity of about 75% and a region (L4) corresponding to the protruding portion had a porosity of about 41%. The molded article was incinerated, and the mean fiber length of the remaining fibers was measured, resulting in a value of 8.6 mm. The molded article had excellent surface appearance, high rigidity, and high resistance to buckling.

What is claimed is:

1. A fiber-reinforced resin molded article having pores, comprising:

an inner portion;

an outer peripheral portion surrounding the inner portion and having a porosity lower than that of the inner portion; and an inner rib portion provided in the inner portion and having a porosity lower than that of the inner portion.

2. The fiber-reinforced resin molded article according to claim 1, wherein the fiber is glass fiber, the fiber content is 10–70 wt. % with respect to the weight of the molded article, and the mean length of the fiber is 1–20 mm.

3. The fiber-reinforced resin molded article according to claim 1, wherein a face material is integrally molded with the molded article.

* * * * *

UNITED STATES PATENT AND TRADEMARK OFFICE
CERTIFICATE OF CORRECTION

PATENT NO.     : 6,368,701 B1
DATED          : April 9, 2002
INVENTOR(S)    : Nomura et al.

It is certified that error appears in the above-identified patent and that said Letters Patent is hereby corrected as shown below:

<u>Title page,</u>
Item [73], the Assignee should read as follows:
-- Idemitsu Petrochemical Co., Ltd.,
   Tokyo (JP) --

Signed and Sealed this

Tenth Day of December, 2002

JAMES E. ROGAN
*Director of the United States Patent and Trademark Office*